US011092768B2

(12) United States Patent
Aznag et al.

(10) Patent No.: US 11,092,768 B2
(45) Date of Patent: Aug. 17, 2021

(54) CABLE CLAMP AND TELECOMMUNICATIONS ENCLOSURE

(71) Applicant: CommScope Connectivity Belgium BVBA, Kessel-Lo (BE)

(72) Inventors: Mohamed Aznag, Scherpenheuvel (BE); Emilie De Groe, Kessel-Lo (BE); Dirk Kempeneers, Aarschot (BE); Eric Marcel M. Keustermans, Houwaart (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/506,281

(22) Filed: Jul. 9, 2019

(65) Prior Publication Data

US 2020/0003984 A1   Jan. 2, 2020

Related U.S. Application Data

(63) Continuation of application No. 14/390,529, filed as application No. PCT/EP2013/056066 on Mar. 22, 2013, now Pat. No. 10,379,310.
(Continued)

(51) Int. Cl.
*G02B 6/44* (2006.01)
*G02B 6/46* (2006.01)

(52) U.S. Cl.
CPC ......... *G02B 6/4471* (2013.01); *G02B 6/4446* (2013.01); *G02B 6/46* (2013.01); *Y10T 29/49826* (2015.01)

(58) Field of Classification Search
CPC ....... G02B 6/4471; G02B 6/4446; G02B 6/46
See application file for complete search history.

(56) References Cited

U.S. PATENT DOCUMENTS 3,552,696 A   1/1971   Orenick
4,552,998 A   11/1985   Ziegler
(Continued)

FOREIGN PATENT DOCUMENTS

DE   37 26 718 A1   2/1989
EP   0 646 294 B1   11/1996
(Continued)

OTHER PUBLICATIONS

International Search Report for International Application No. PCT/EP2013/056066 dated Aug. 28, 2013 (5 pages).

*Primary Examiner* — Thomas A Hollweg
*Assistant Examiner* — Mary A El-Shammaa
(74) *Attorney, Agent, or Firm* — Merchant & Gould P.C.

(57) ABSTRACT

A telecommunications closure (10) comprising cables (46), a cover (20), an interior frame (30), the frame (30) holding telecommunications equipment (32), and a seal block (40) sealing the cover (20) closed relative to one or more cables (46) which enter the closure (10). The frame (30) defines a plurality of clamp assembly holders (36). A plurality of clamp assemblies (60, 160, 260) are provided, each clamp assembly (60, 160, 260) for holding a cable including a jacket (48), interior optical fibers (52), and at least one interior strength member (50). Each clamp assembly (60, 160, 260) includes a jacket clamp assembly (64, 164, 264) moveable relative to the frame, and including a wrap (68) which mounts around the jacket, and a strength member clamp assembly (80, 180, 280) moveable relative to the frame. The wrap (68) wraps around the jacket (48) and is adjustable for different jacket diameters. The strength member clamp assembly (80, 180, 280) is mountable in a plurality of positions relative to the jacket clamp assembly (64, 164, 264) to account for variations in the relative location of the strength member relative to the jacket clamp assembly. The clamp assembly (60, 160, 260) is moveable (Continued)

relative to the frame (30) wherein the cable (46) is allowed to move to a proper position relative to the seal block (40) so as to reduce the likelihood of a leak by being centrally positioned relative to the cable opening through the seal block.

13 Claims, 41 Drawing Sheets

Related U.S. Application Data

(60) Provisional application No. 61/619,676, filed on Apr. 3, 2012, provisional application No. 61/766,495, filed on Feb. 19, 2013.

(56) References Cited

U.S. PATENT DOCUMENTS

| | | |
|---|---|---|
| 4,986,761 A | 1/1991 | Gladden, Jr. et al. |
| 5,121,458 A | 6/1992 | Nilsson et al. |
| 5,440,666 A | 8/1995 | Burek et al. |
| 5,455,391 A | 10/1995 | Demesmaeker et al. |
| 5,491,766 A | 2/1996 | Huynh |
| 5,502,282 A | 3/1996 | Kunze |
| 5,696,351 A | 12/1997 | Benn et al. |
| 5,775,702 A | 7/1998 | Laeremans et al. |
| 5,814,770 A | 9/1998 | Pieck et al. |
| 5,824,961 A | 10/1998 | Burek et al. |
| 5,883,333 A | 3/1999 | Wambeke et al. |
| 6,051,792 A | 4/2000 | Damm et al. |
| 6,150,608 A | 11/2000 | Wambeke et al. |
| 6,322,378 B1 | 11/2001 | Auclair |
| 6,933,442 B2 | 8/2005 | Franks, Jr. |
| 7,254,307 B2 | 8/2007 | Xin |
| 8,903,216 B2 | 12/2014 | Thompson et al. |
| 9,753,239 B2 | 9/2017 | Allen et al. |
| 10,209,473 B2 | 2/2019 | Bishop et al. |
| 10,495,838 B2 | 12/2019 | Coenegracht et al. |
| 2004/0226734 A1 | 11/2004 | Franks |
| 2006/0150483 A1 | 7/2006 | Zayer |
| 2006/0275006 A1 | 12/2006 | Xin |
| 2006/0283619 A1 | 12/2006 | Kowalczyk et al. |
| 2007/0235422 A1 | 10/2007 | Bornemann |
| 2010/0054688 A1 | 3/2010 | Mullaney et al. |
| 2010/0061692 A1 | 3/2010 | Hetzer et al. |
| 2010/0092147 A1 | 4/2010 | Desard et al. |
| 2012/0230646 A1 | 9/2012 | Thompson et al. |
| 2013/0058616 A1 | 3/2013 | Cote et al. |
| 2014/0314388 A1 | 10/2014 | Alaerts et al. |
| 2015/0093090 A1 | 4/2015 | Aznag et al. |
| 2015/0168663 A1 | 6/2015 | Aznag et al. |
| 2016/0077300 A1 | 3/2016 | Geens et al. |
| 2018/0261986 A1 | 9/2018 | Kempeneers et al. |

FOREIGN PATENT DOCUMENTS

| | | |
|---|---|---|
| EP | 0 646 295 B1 | 12/1996 |
| GB | 2 298 053 A | 8/1996 |
| JP | 2012-154419 A | 8/2012 |
| KR | 10-1606203 B1 | 3/2016 |
| WO | 96/09671 A1 | 3/1996 |
| WO | 96/24185 A1 | 8/1996 |
| WO | 97/12268 A1 | 4/1997 |
| WO | 2005/020400 A1 | 3/2005 |
| WO | 2013/092220 A2 | 6/2013 |
| WO | 2013/149846 A1 | 10/2013 |

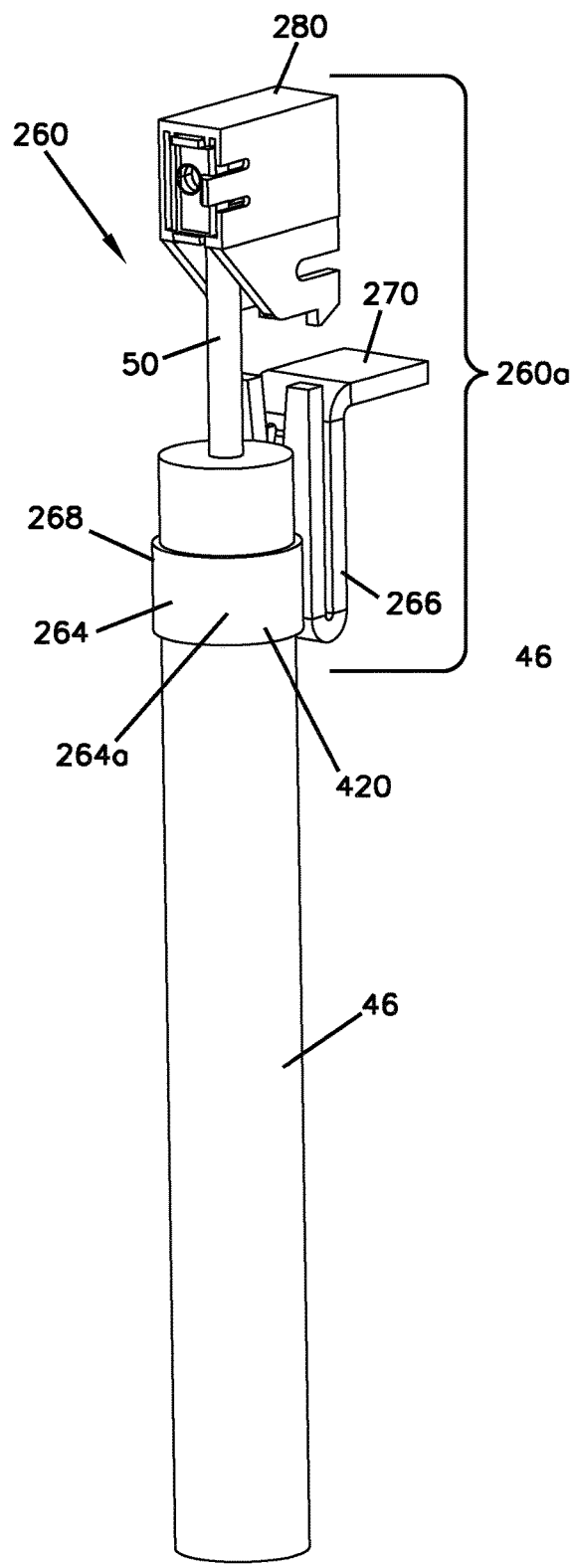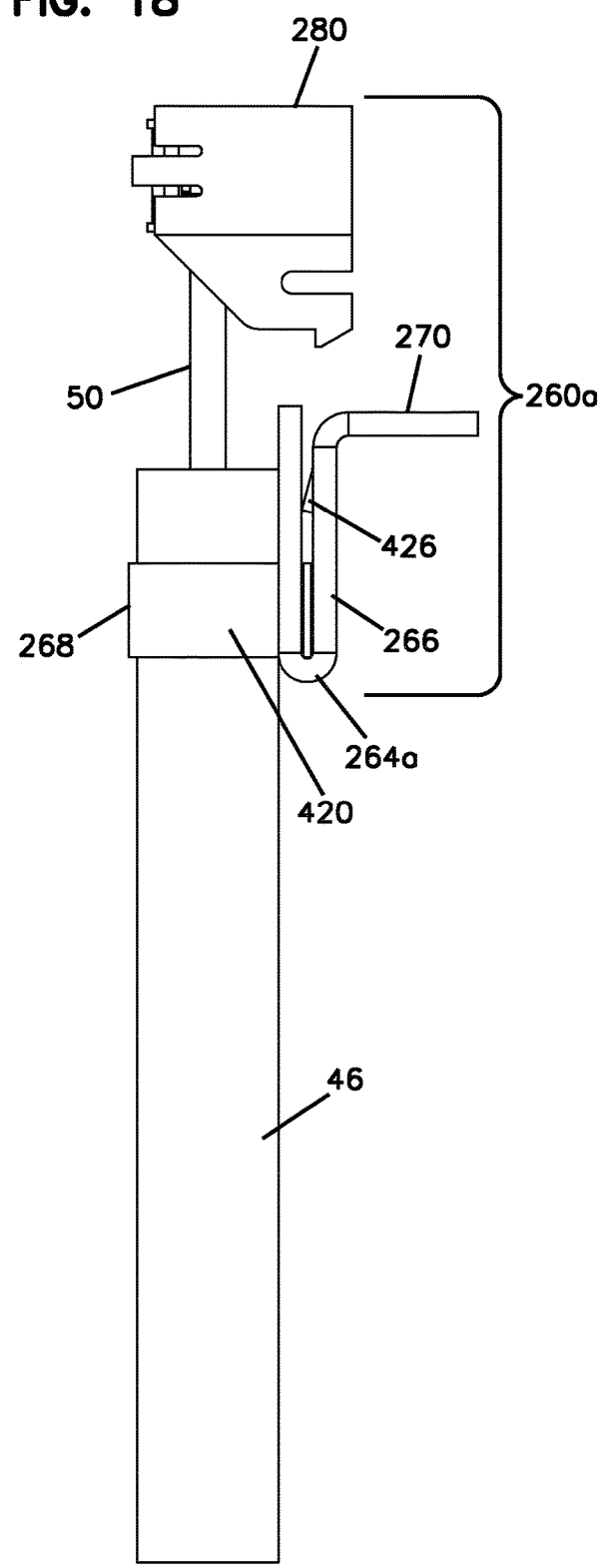

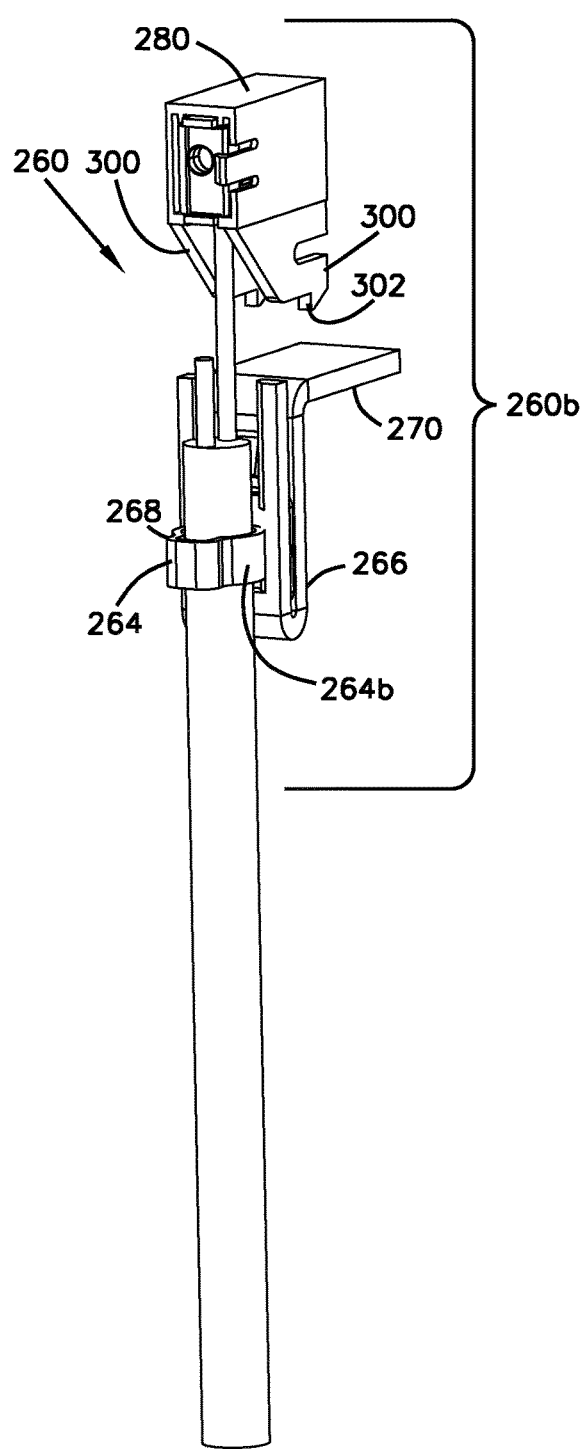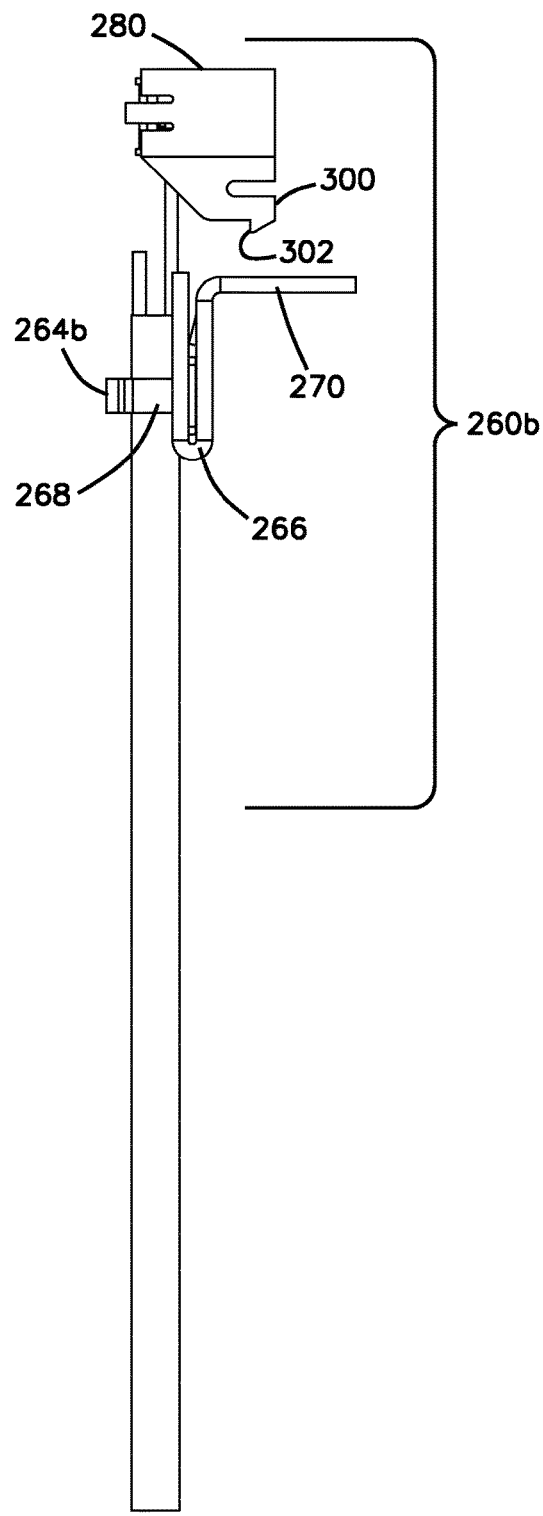

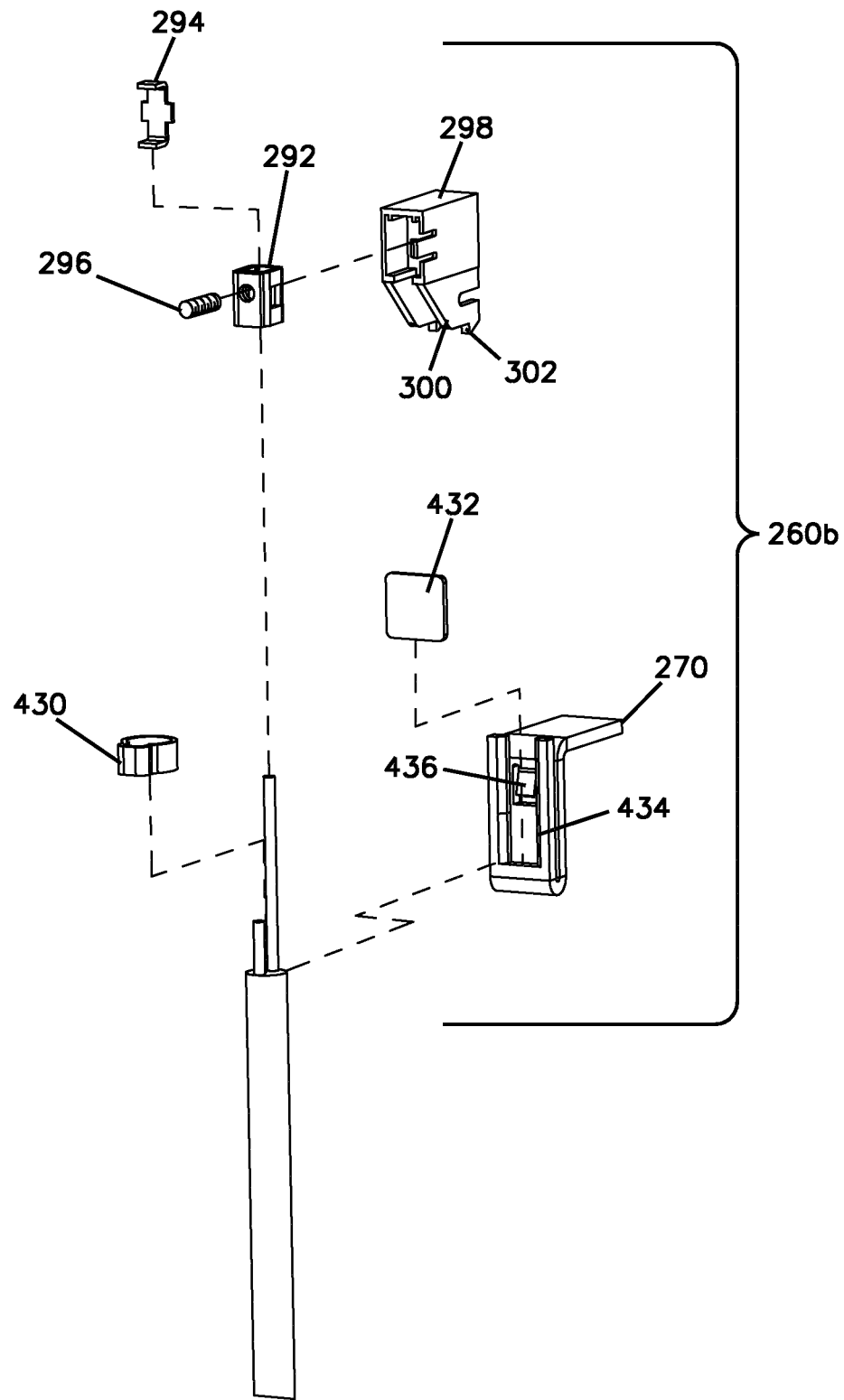

FIG. 23
FIG. 24
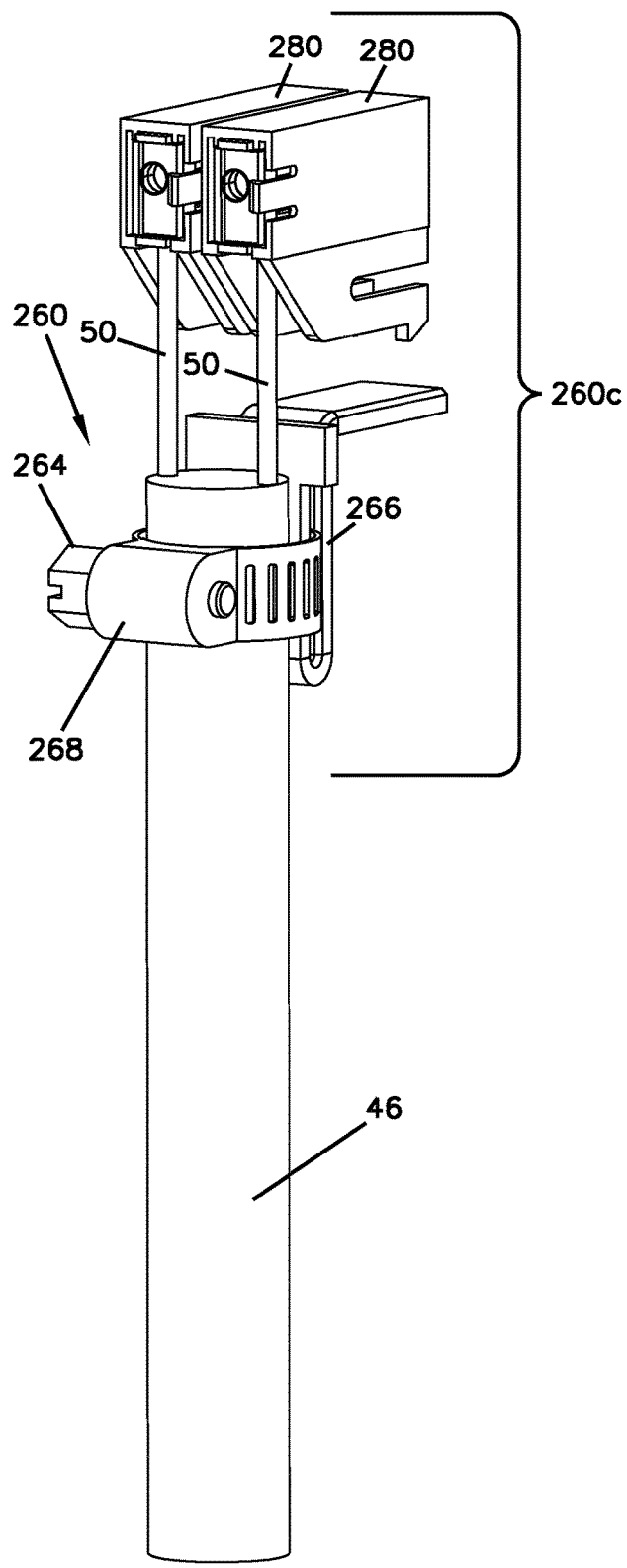
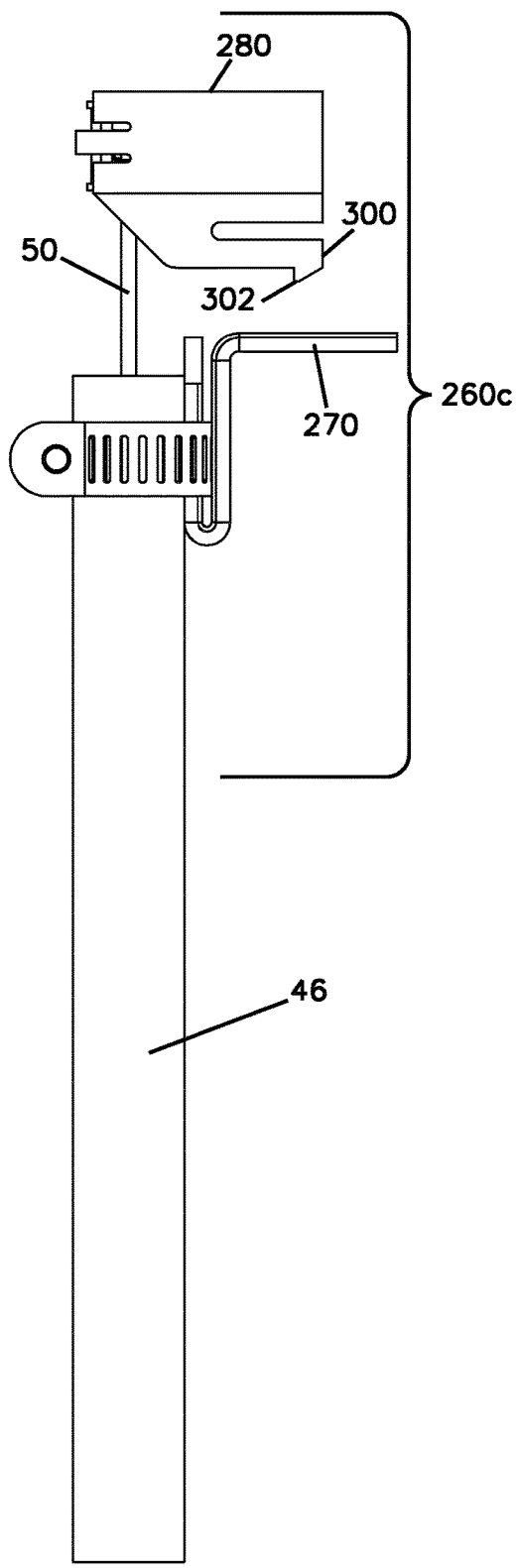

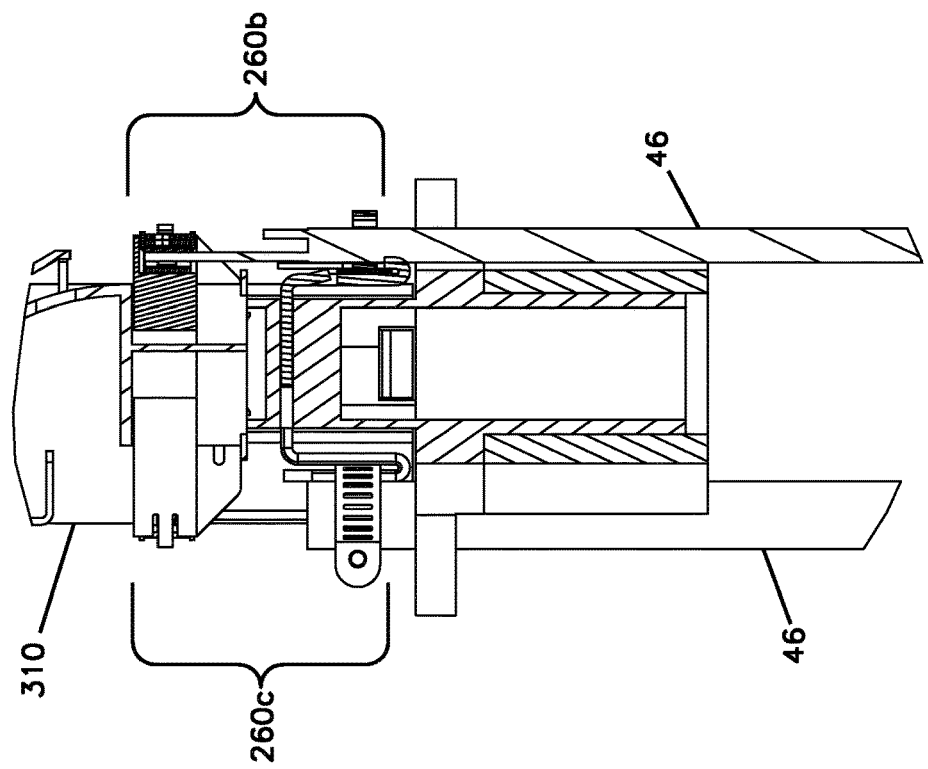
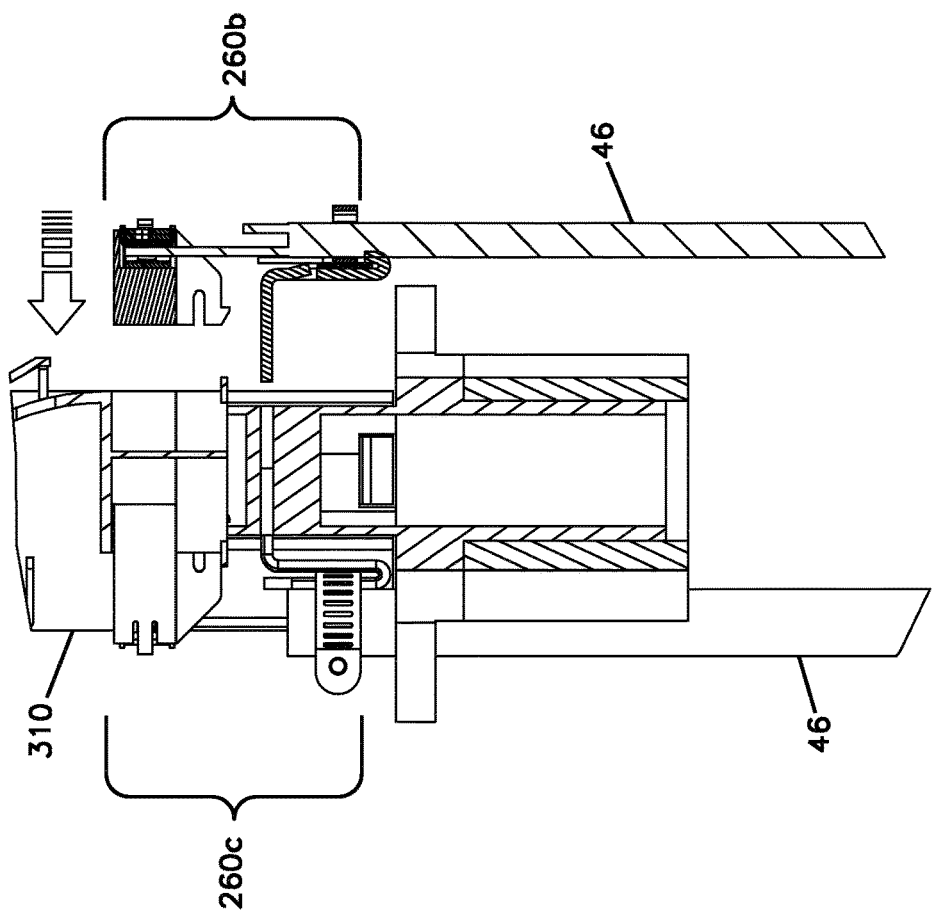

CABLE CLAMP AND TELECOMMUNICATIONS ENCLOSURE

This application is a Continuation of U.S. patent application Ser. No. 14/390,529, filed 3 Oct. 2014, now U.S. Pat. No. 10,379,310, which is a National Stage Application of PCT/EP2013/056066, filed 22 Mar. 2013, which claims benefit of U.S. Provisional Ser. No. 61/619,676, filed 3 Apr. 2012 and U.S. Provisional Ser. No. 61/766,495, filed 19 Feb. 2013 and which applications are incorporated herein by reference. To the extent appropriate, a claim of priority is made to each of the above disclosed applications.

TECHNICAL FIELD

The present disclosure relates to telecommunications enclosures, and more particularly to telecommunications enclosures including cable clamps for fiber optic cables.

BACKGROUND

Telecommunications system typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, and wave division multiplexers.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants.

SUMMARY

The present invention relates to a cable clamp and telecommunications enclosure. The telecommunications enclosure includes a cover and interior telecommunications equipment including an interior frame. A seal block seals the cover closed relative to one or more cables which enter the enclosure. The frame defines a plurality of clamp assembly holders for clamping to the cables, and for mounting the cables to the enclosure.

The present invention concerns a variety of cable clamp assemblies for clamping to a cable for use in an enclosure or other device. Each clamp assembly holds a cable jacket of a cable including an interior optical fiber or fibers, and at least one interior strength member. Each clamp assembly includes a jacket clamp assembly, and a strength member clamp assembly.

In one embodiment, the jacket clamp assembly is connected to the strength member clamp assembly through a body construction. In another embodiment, the jacket clamp assembly is separate from the strength member clamp assembly.

The clamp assembly may include only a jacket clamp assembly, if desired.

The present invention provides for clamping to a variety of different cable sizes with a single jacket clamp assembly.

The present invention also includes a strength member clamp assembly which can mount to a variety of strength members in different positions.

The present invention relates to mounting of the clamp assembly wherein the cable is allowed to move to a proper position relative to the seal block so as to reduce the likelihood of a leak by being centrally positioned relative to the cable opening through the seal block.

In one embodiment, the jacket clamp assembly is useful for clamping to a variety of different cable sizes with a single jacket clamp assembly, and is usable whether there is a strength member and strength member clamp assembly.

In another embodiment, the strength member clamp assembly can mount to a variety of strength members in different positions relative to the cable and/or a jacket clamp assembly.

The clamp assembly can be mounted to the cable before insertion or attachment to the closure.

Various mounting methods are provided for mounting the cable clamp assemblies to the enclosure. One method includes mounting the cable clamp assemblies to an upper portion of a gel seal block located within an interior of the enclosure.

BRIEF DESCRIPTION OF THE DRAWINGS

FIG. 17 is a perspective view of another embodiment of a clamp assembly;

FIG. 18 is a side view of the clamp assembly of FIG. 17;

FIG. 20 is a perspective view of another embodiment of a clamp assembly;

FIG. 21 is a side view of the clamp assembly of FIG. 20;

FIG. 22 is an exploded view of the clamp assembly of FIG. 20;

FIG. 23 is another perspective view of another embodiment of a clamp assembly;

FIG. 24 is a side view of the clamp assembly of FIG. 23;

FIGS. 30 and 31 show cross-sectional side views of the embodiments of FIGS. 17-25 mounted to the interior frame;

DETAILED DESCRIPTION

Figure 1:
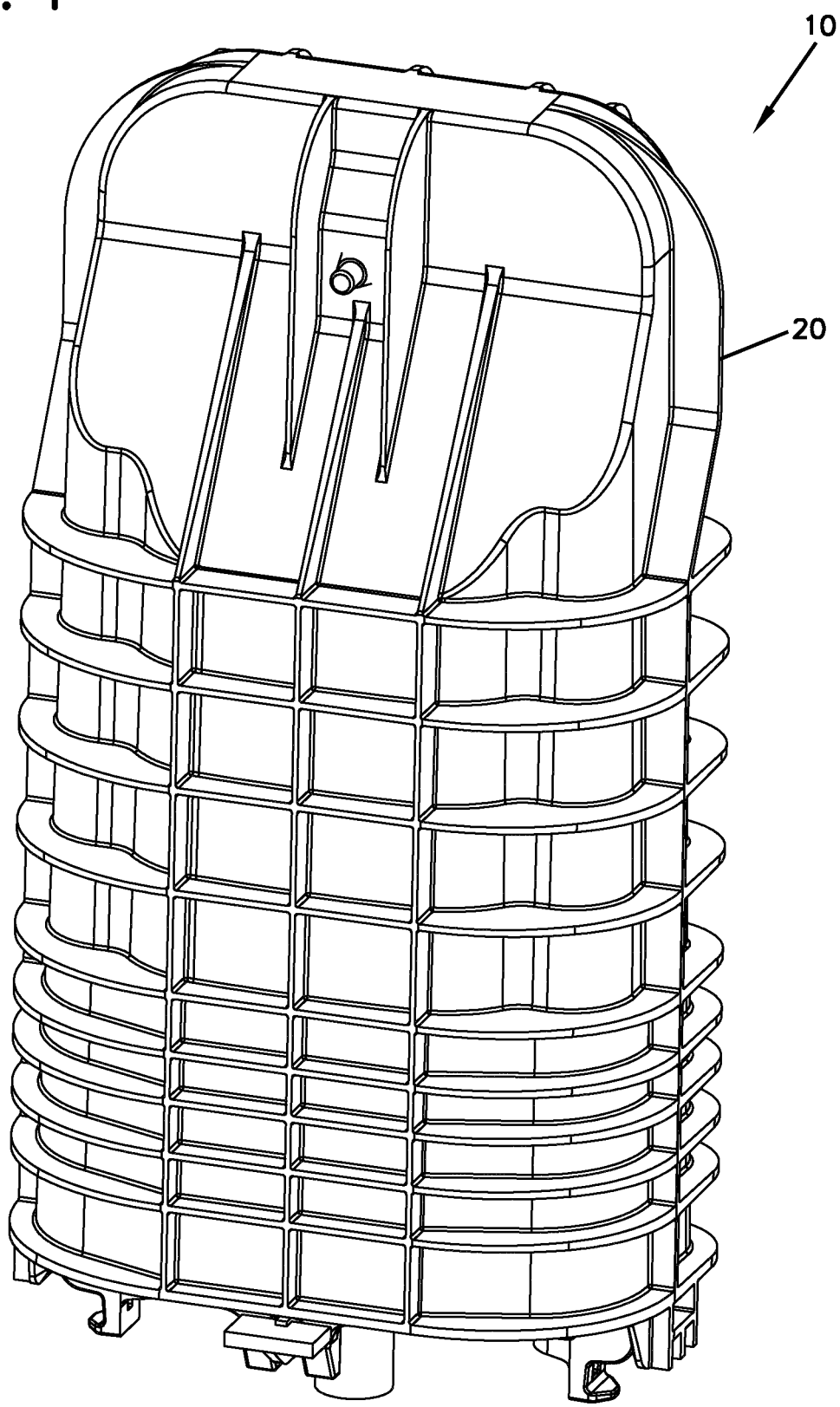
FIG. 1 shows a perspective view of a telecommunications enclosure.
Figure 2A:
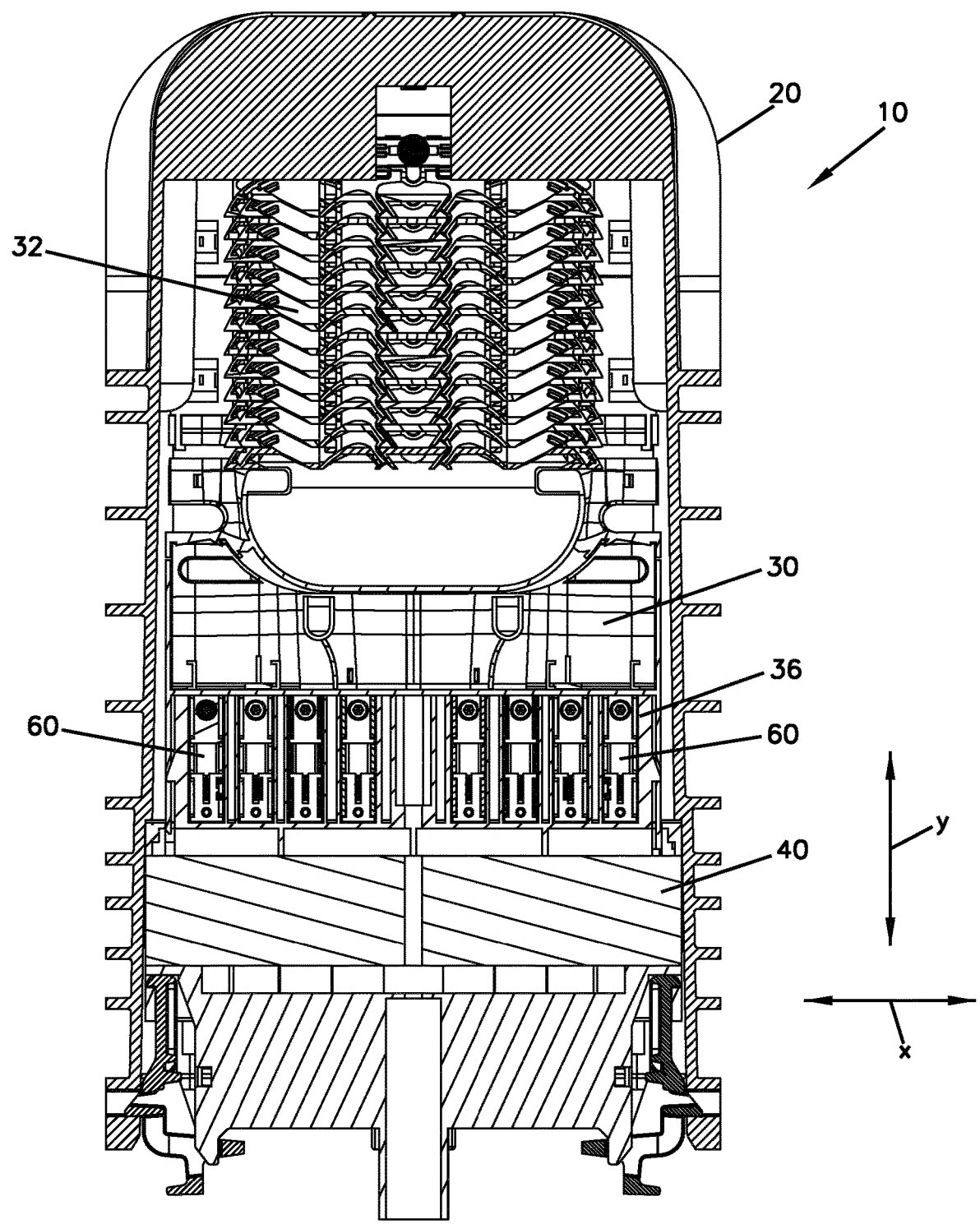
FIGS. 2A and 2B show in cross-section the telecommunication enclosure of FIG. 1.
Figure 2B:
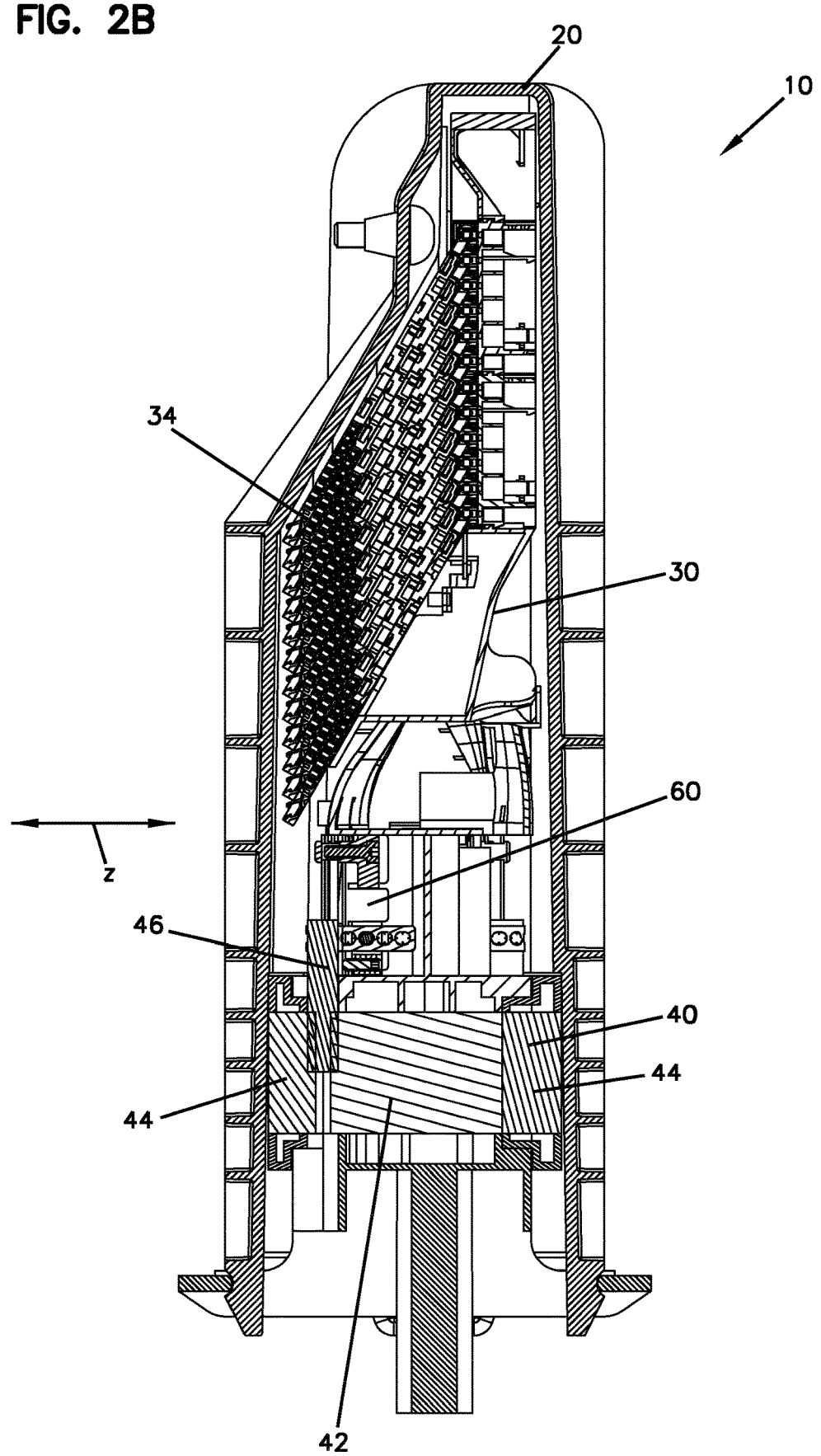
Figure 3:
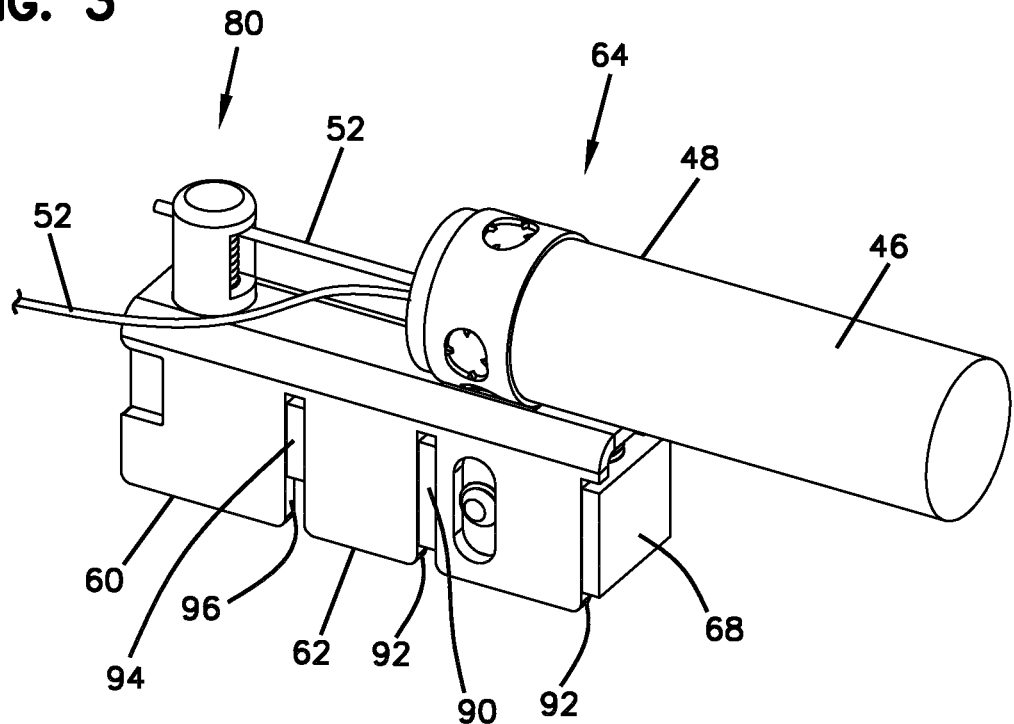
FIG. 3 shows in perspective view a first embodiment of a clamp assembly mounted to a cable.
Figure 4:
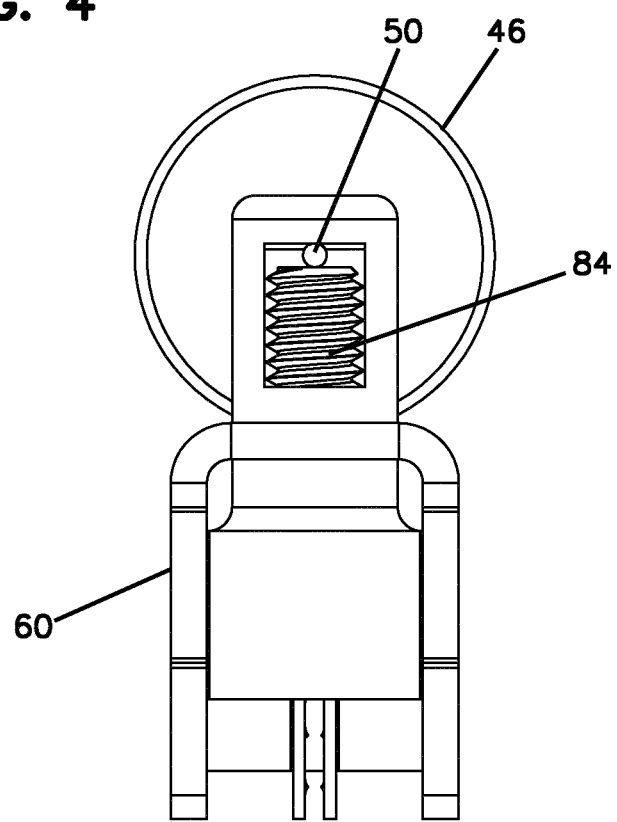
FIG. 4 is a end view of the view FIG. 3.
Figure 5:
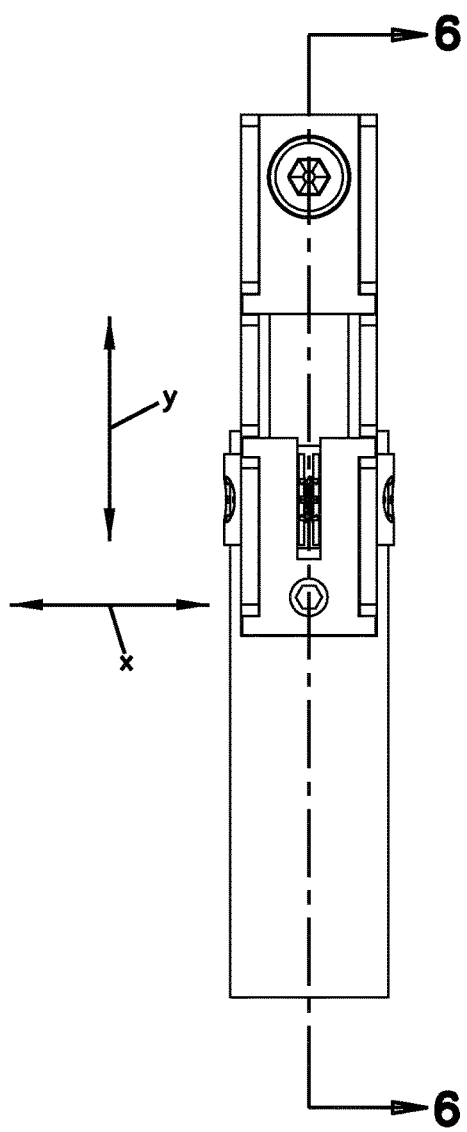
FIG. 5 is a side view of the view of FIG. 3.
Figure 6:
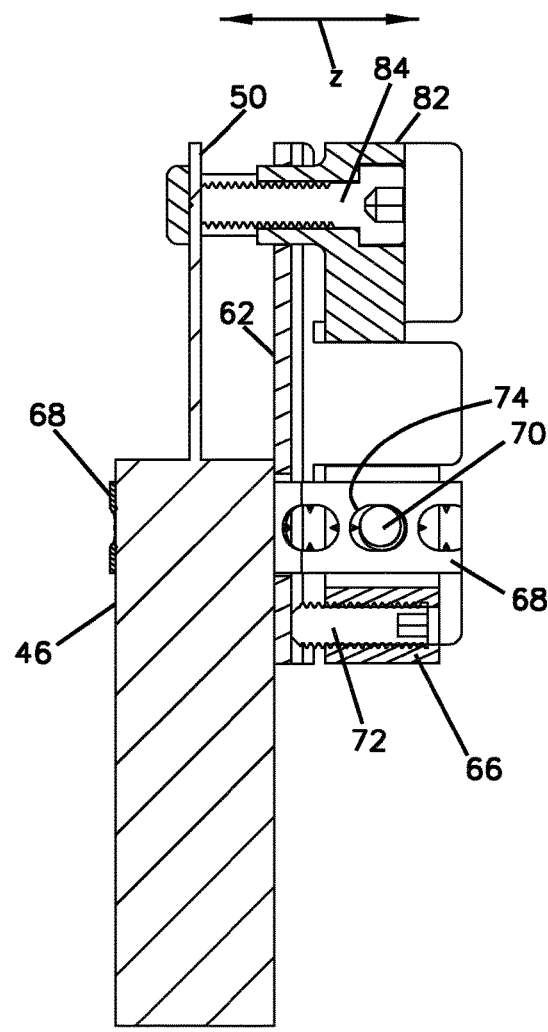
FIG. 6 is a cross-sectional view of the view of FIG. 5 taken along lines 6-6.
Figure 7:
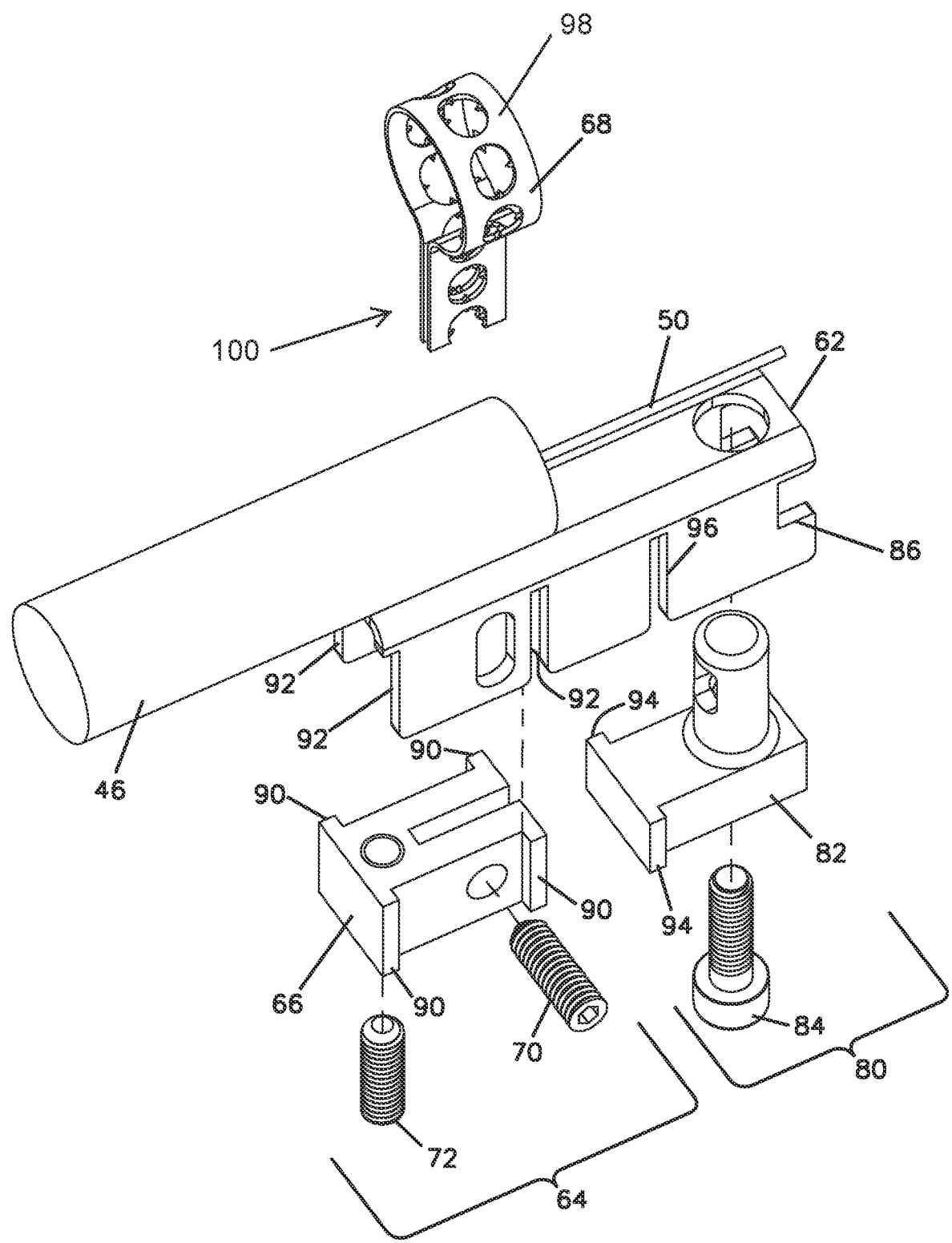
FIG. 7 is an exploded view of the view of FIG. 3.
Figure 8:
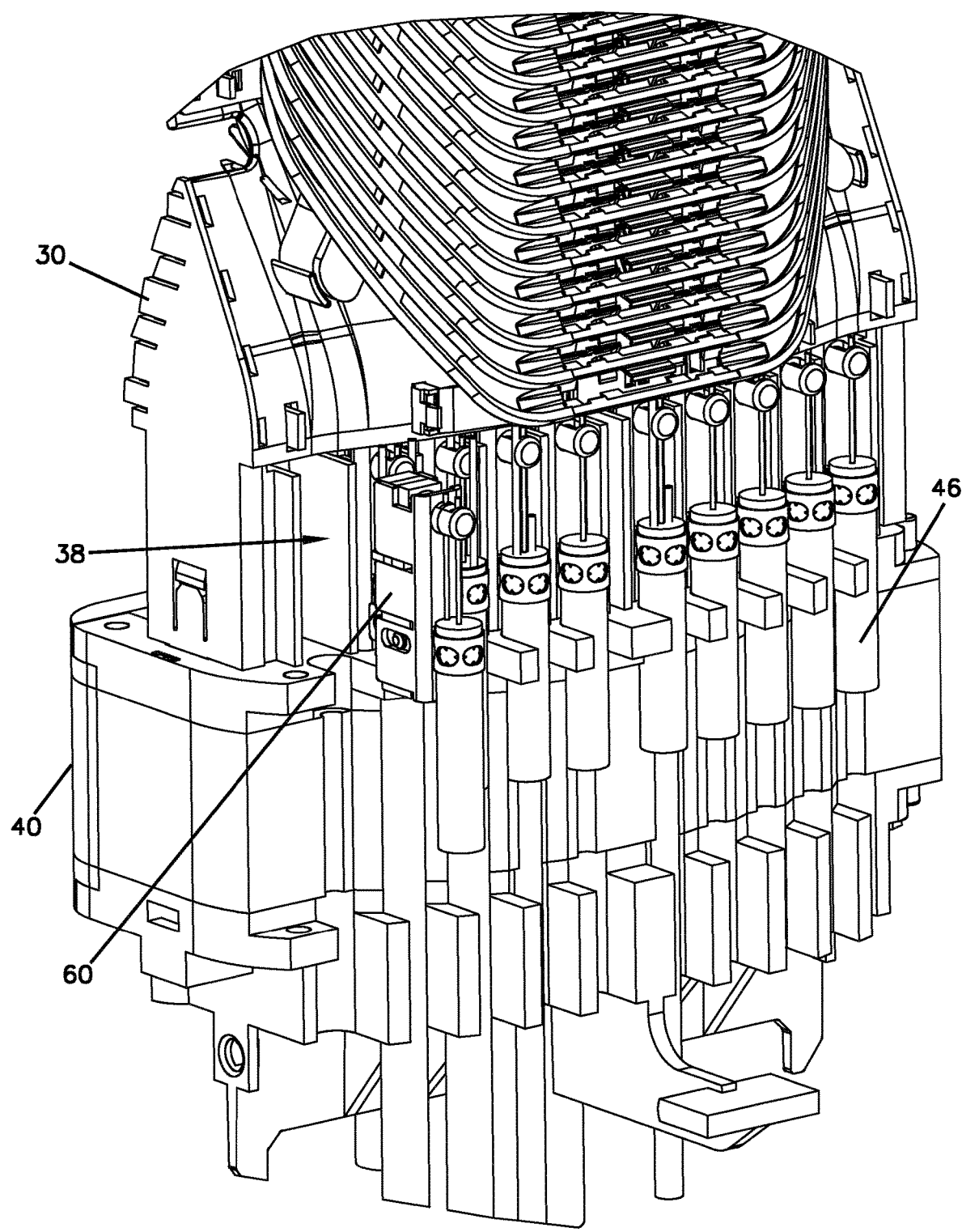
FIG. 8 shows a plurality of clamp assemblies of FIG. 3 mounted to an interior frame of the enclosure.
Figure 9:
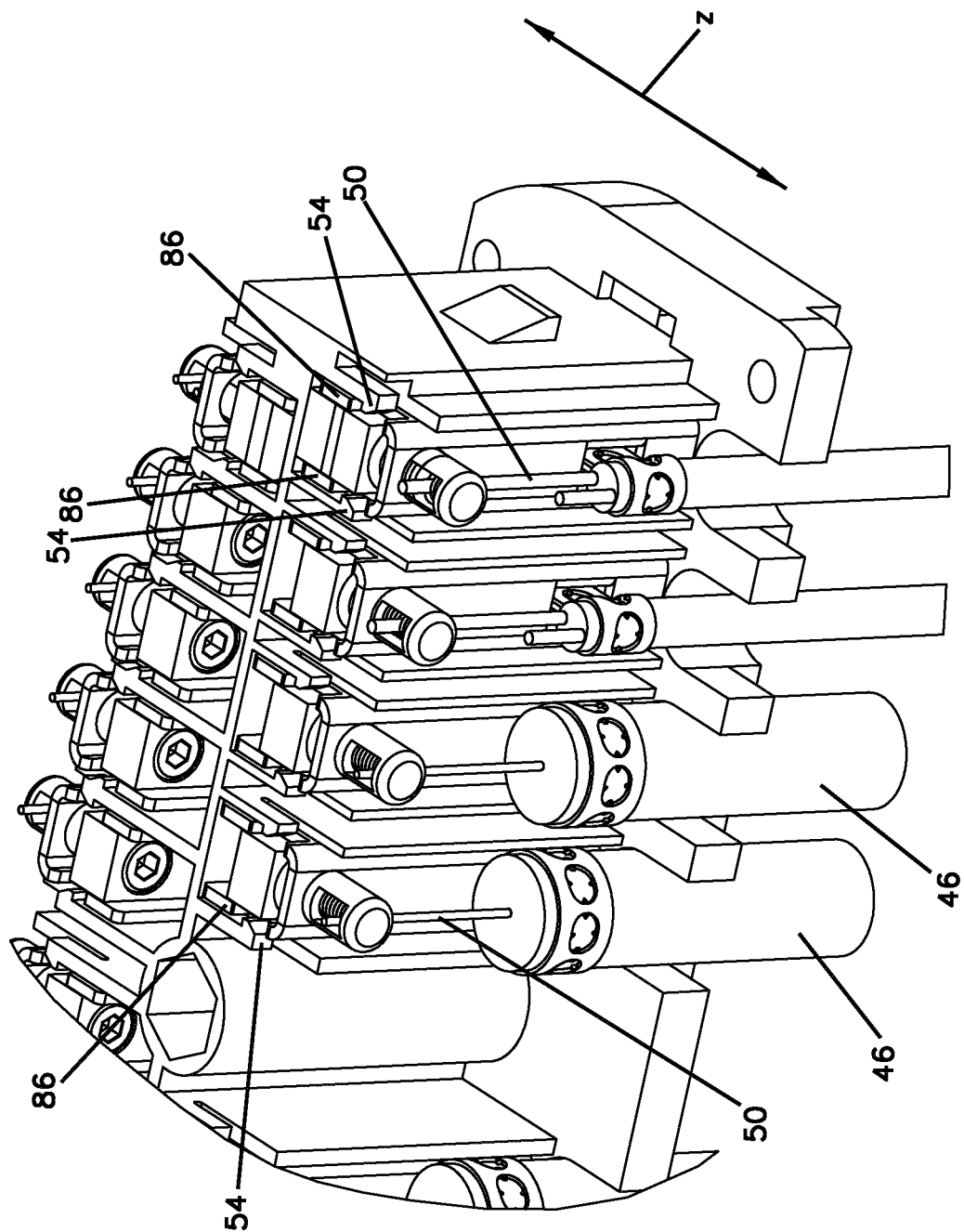
FIG. 9 shows a detail view of the clamp assemblies mounted to the interior frame.
Figure 10:
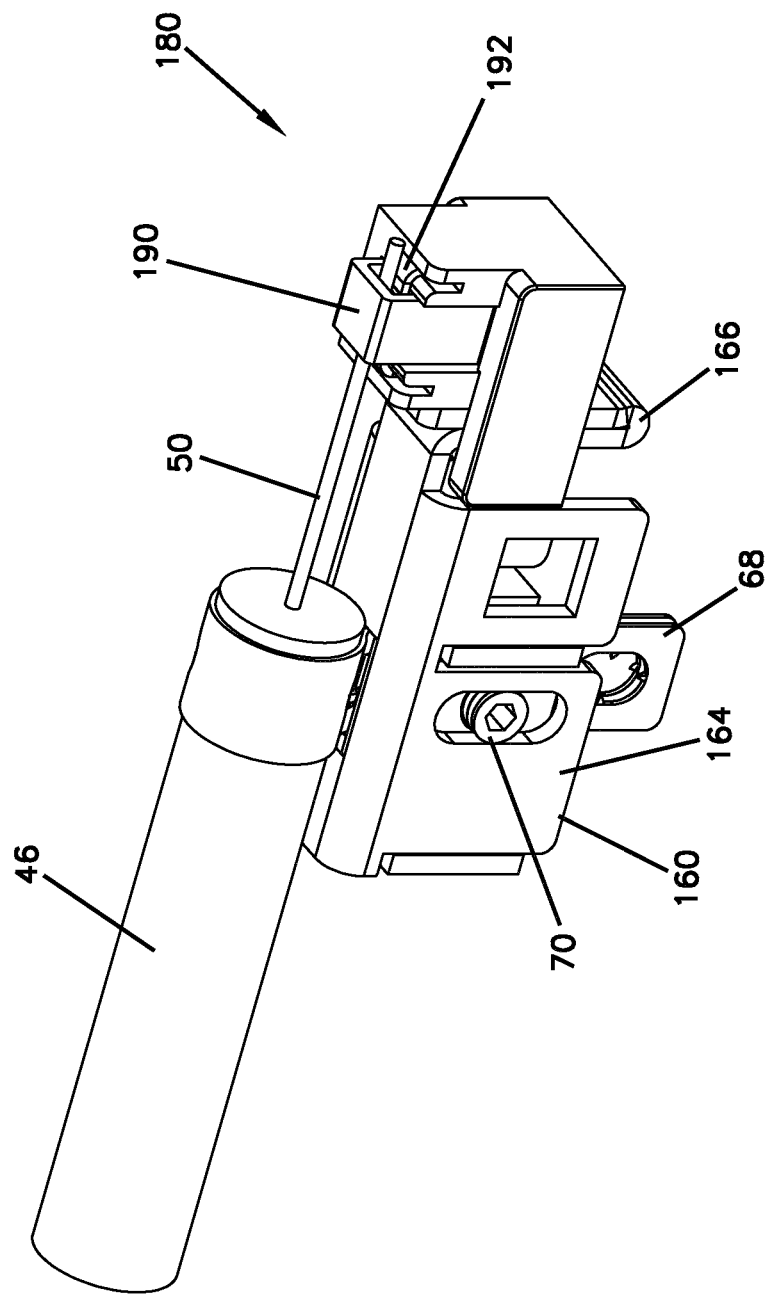
FIG. 10 is a perspective view of an alternative embodiment of a clamp assembly.
Figure 11:
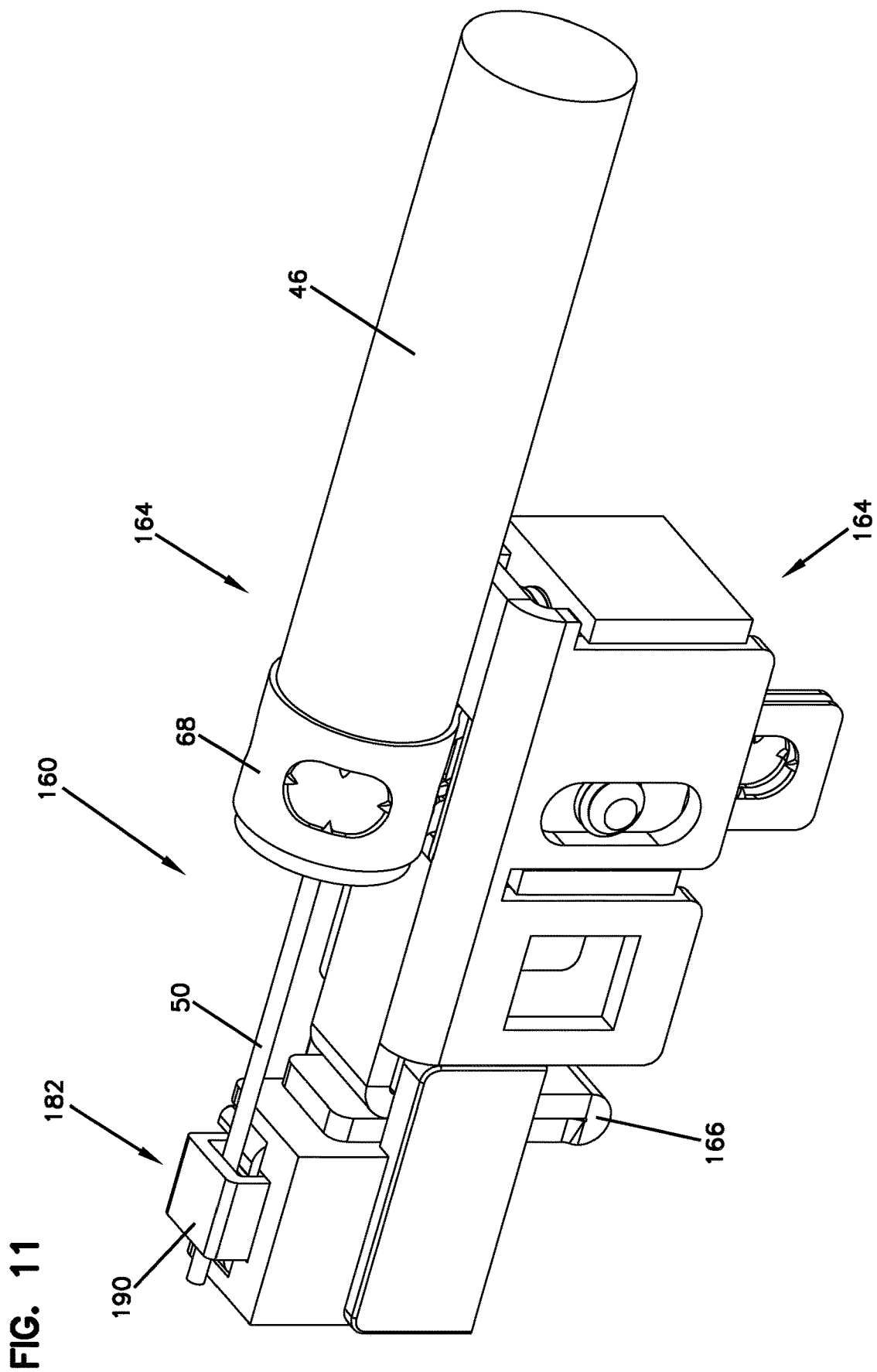
FIG. 11 is another perspective view of the clamp assembly of FIG. 10.
Figure 12:
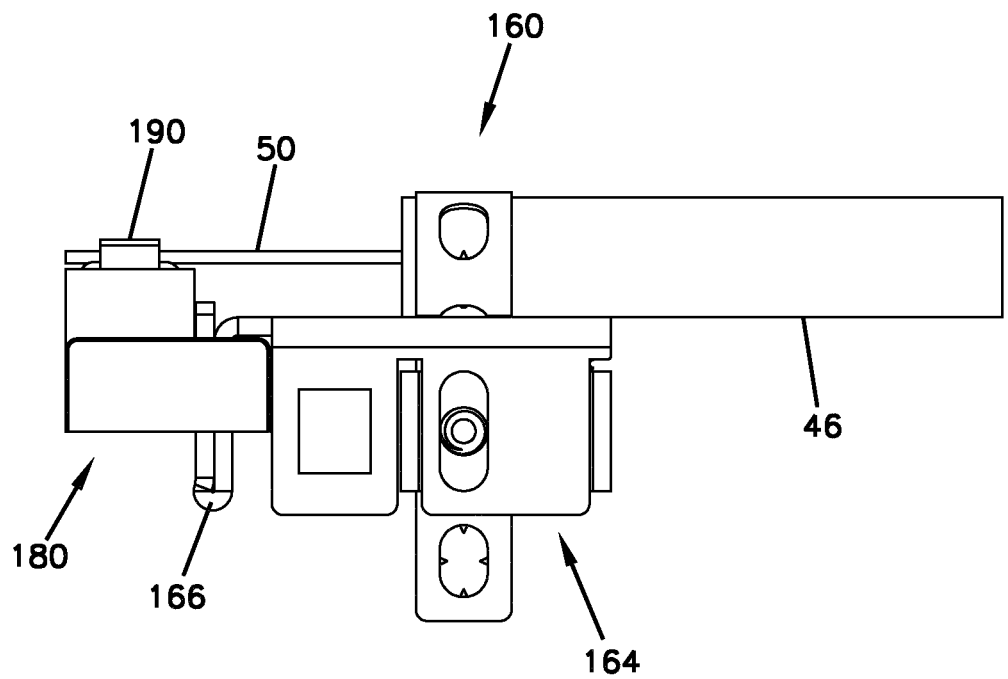
FIG. 12 is a side view of the clamp assembly of FIG. 10.
Figure 13:
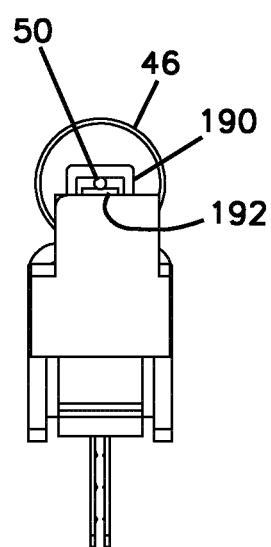
FIG. 13 is an end view of the clamp assembly of FIG. 10.
Figure 14:
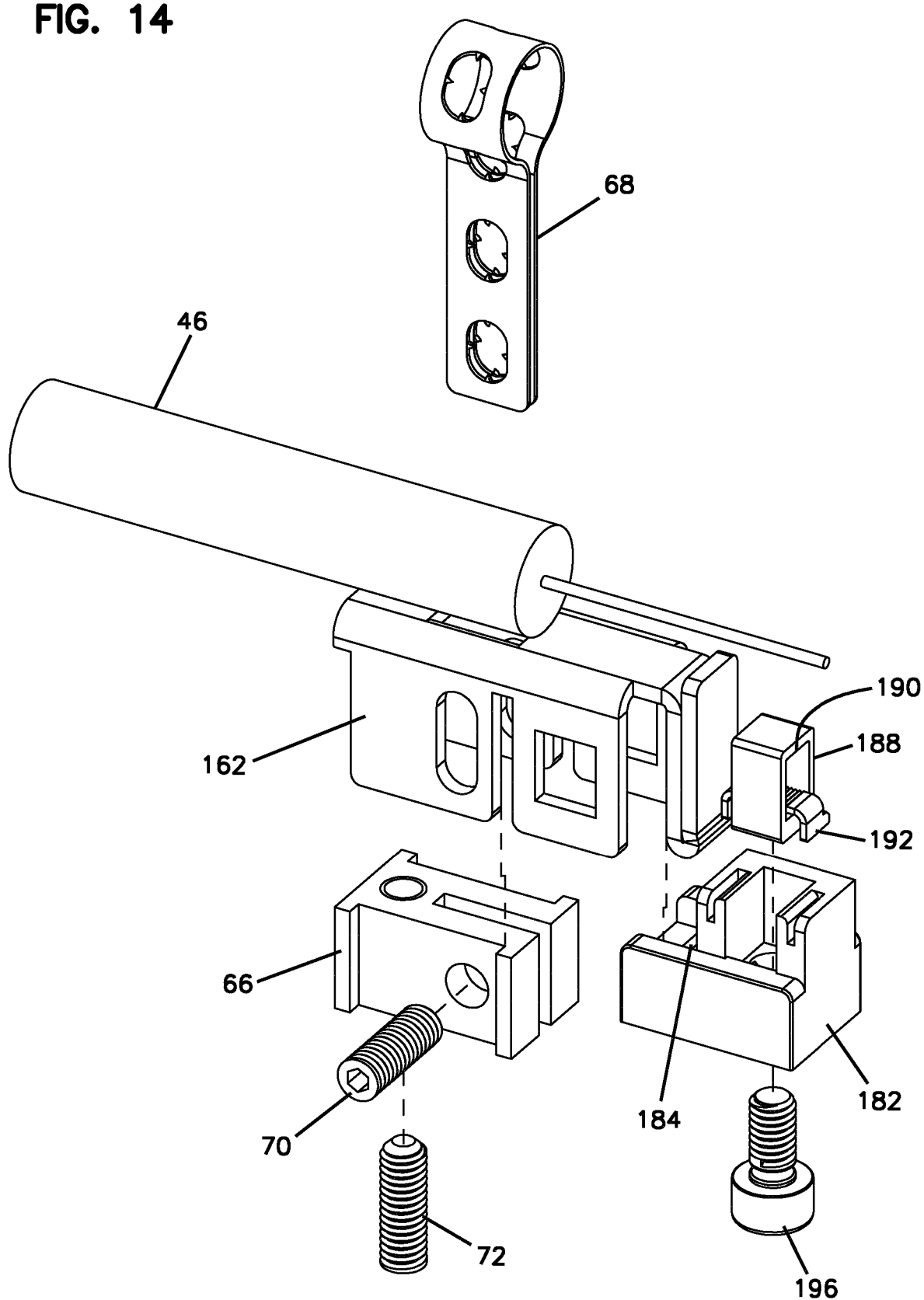
FIG. 14 is an exploded view of the clamp assembly of FIG. 10.
Figure 15:
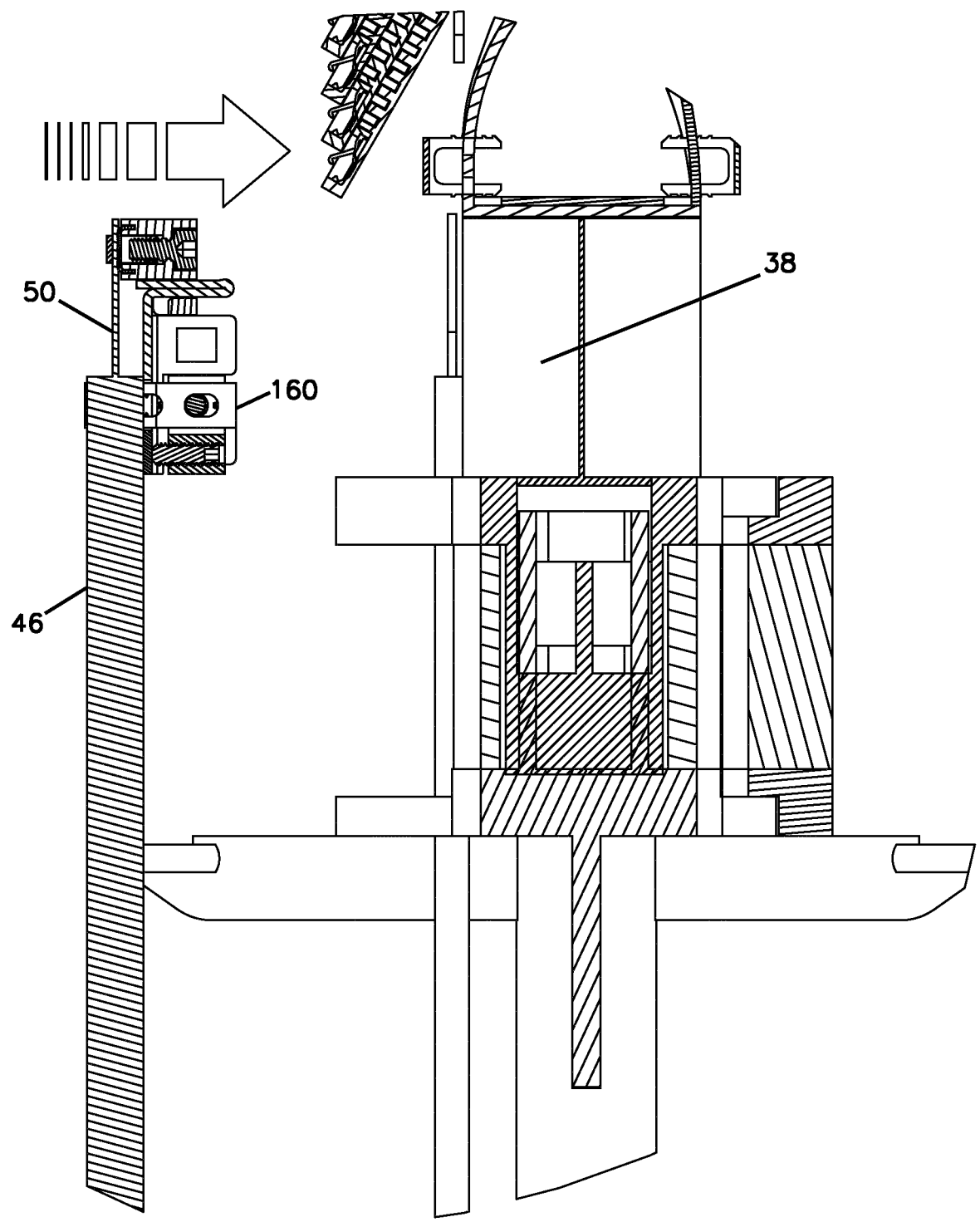
FIG. 15 is a cross-sectional view showing the clamp assembly of FIG. 10 prior to mounting to an interior frame of a telecommunications enclosure.
Figure 16:
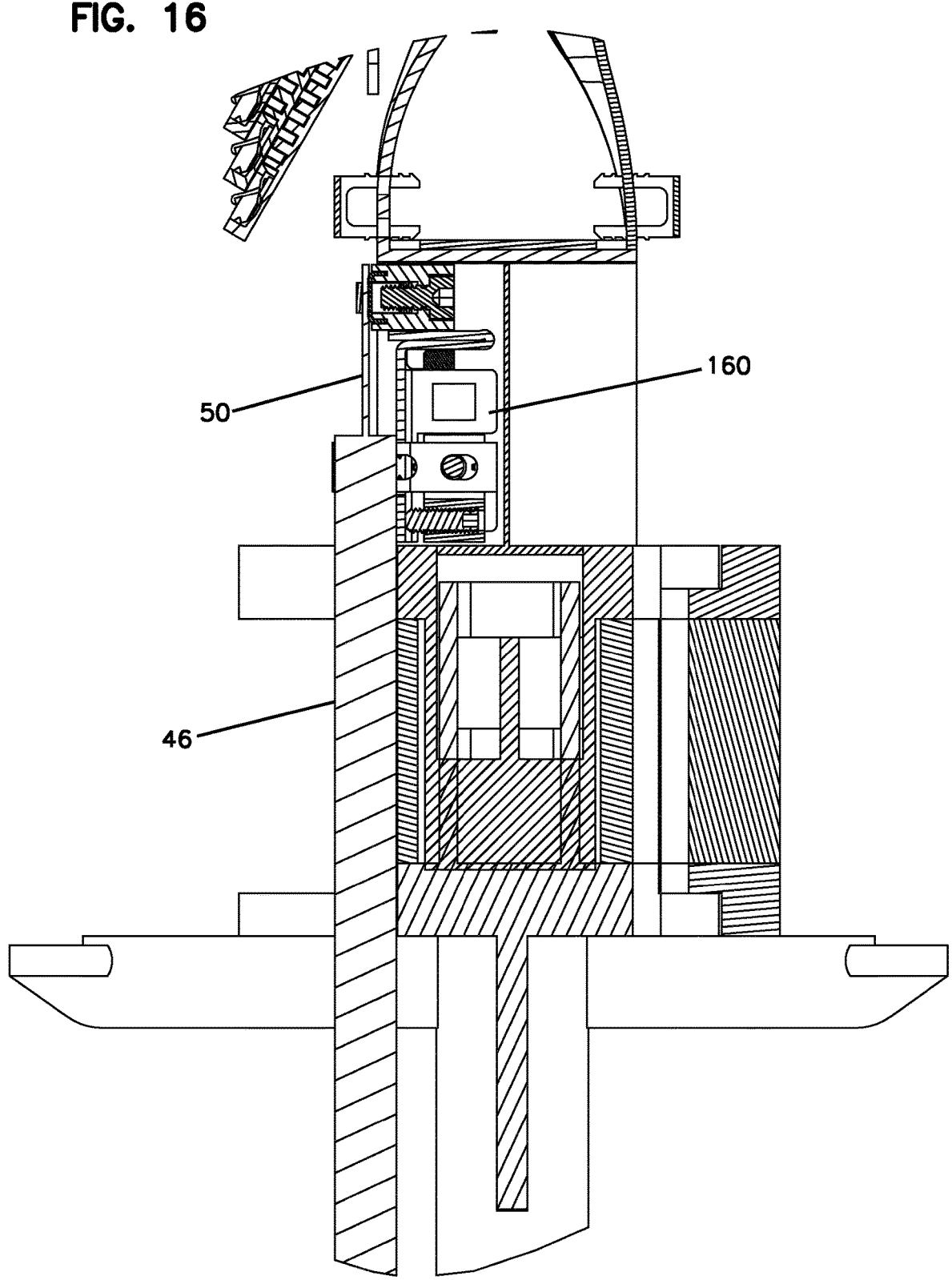
FIG. 16 shows the clamp assembly of FIG. 10 mounted to the interior frame of the telecommunications enclosure.
Figure 19:
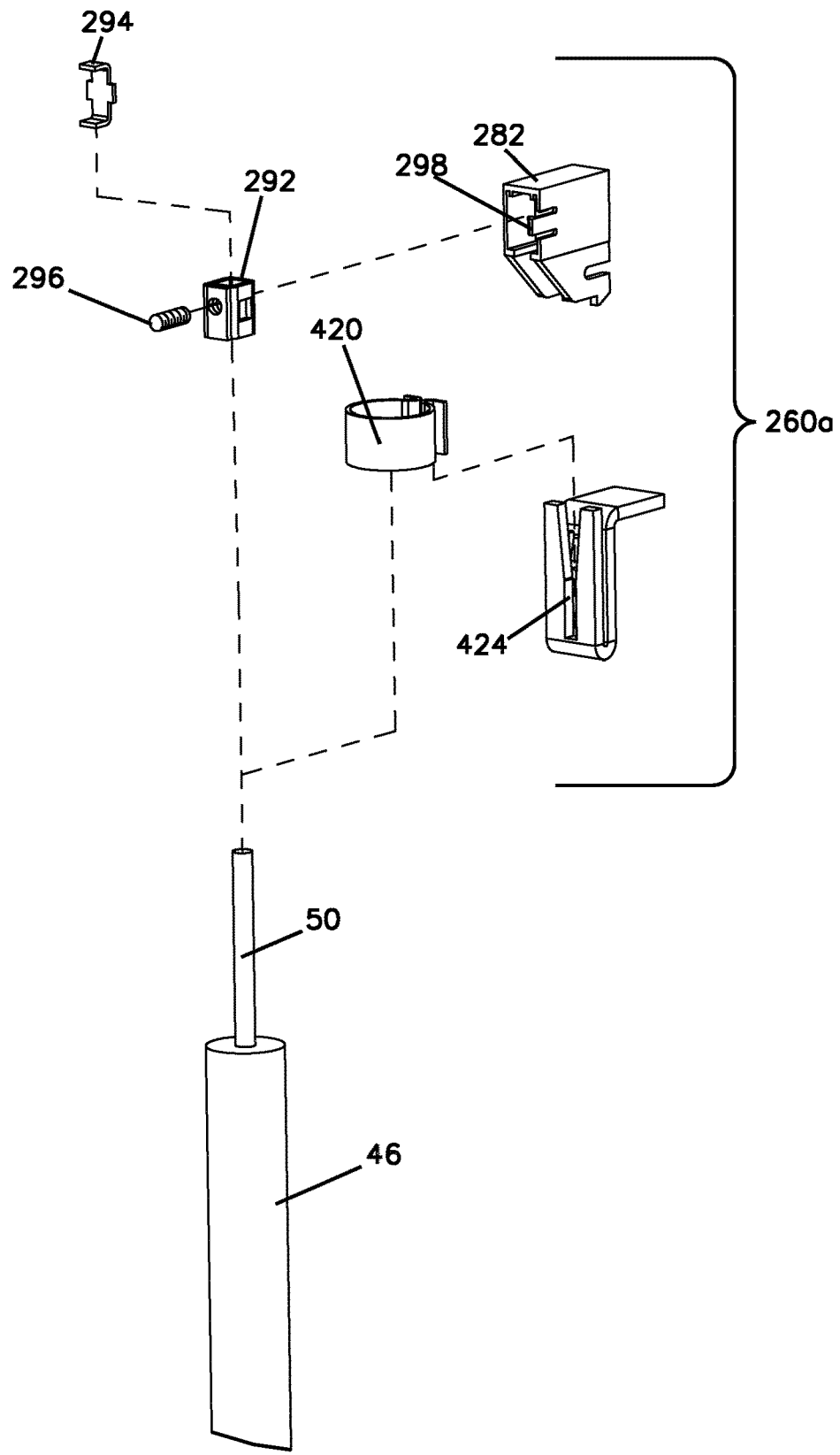
FIG. 19 is an exploded view of the clamp assembly of FIG. 17.
Figure 25:
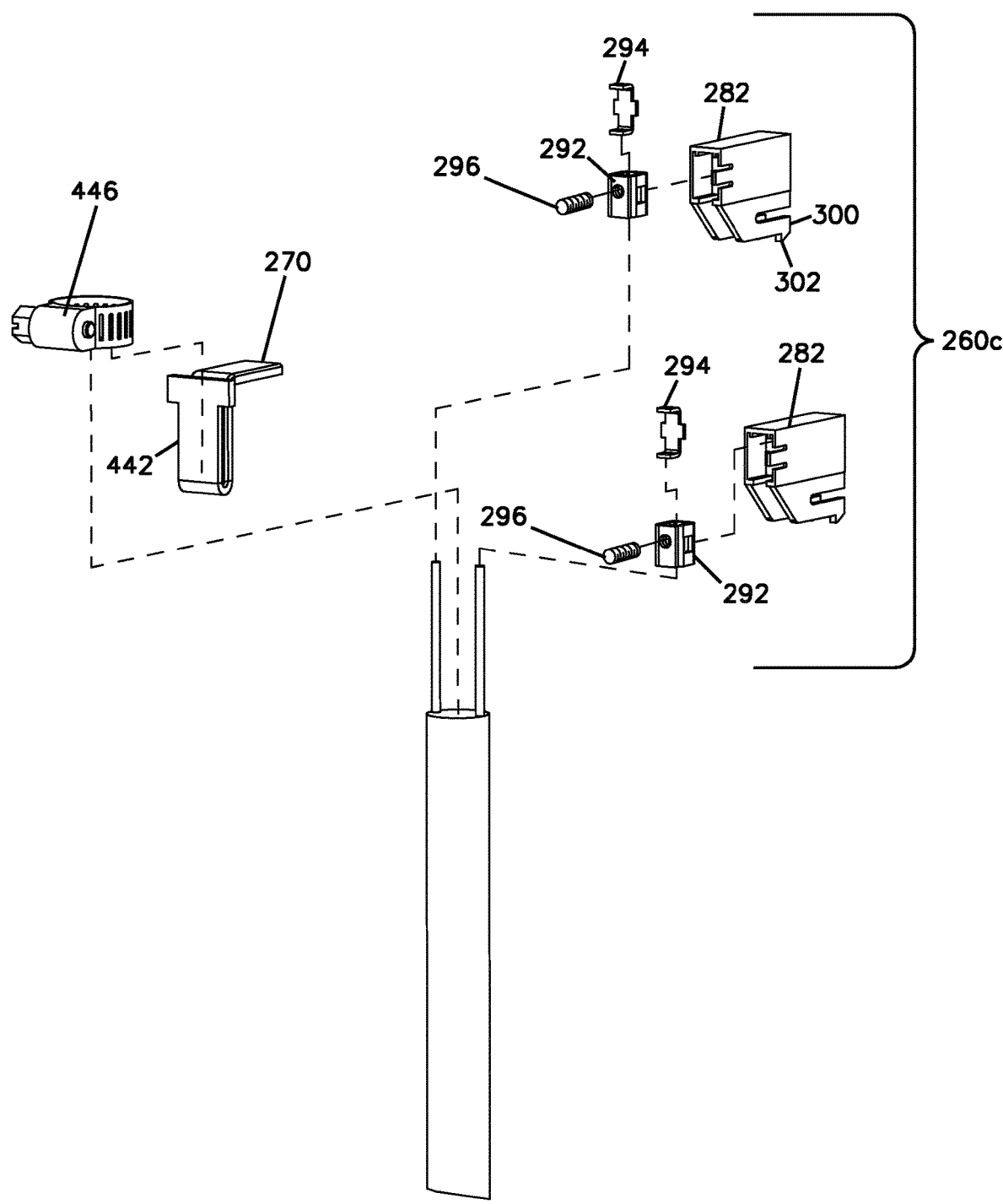
FIG. 25 is an exploded view of the clamp assembly FIG. 23.
Figure 26:
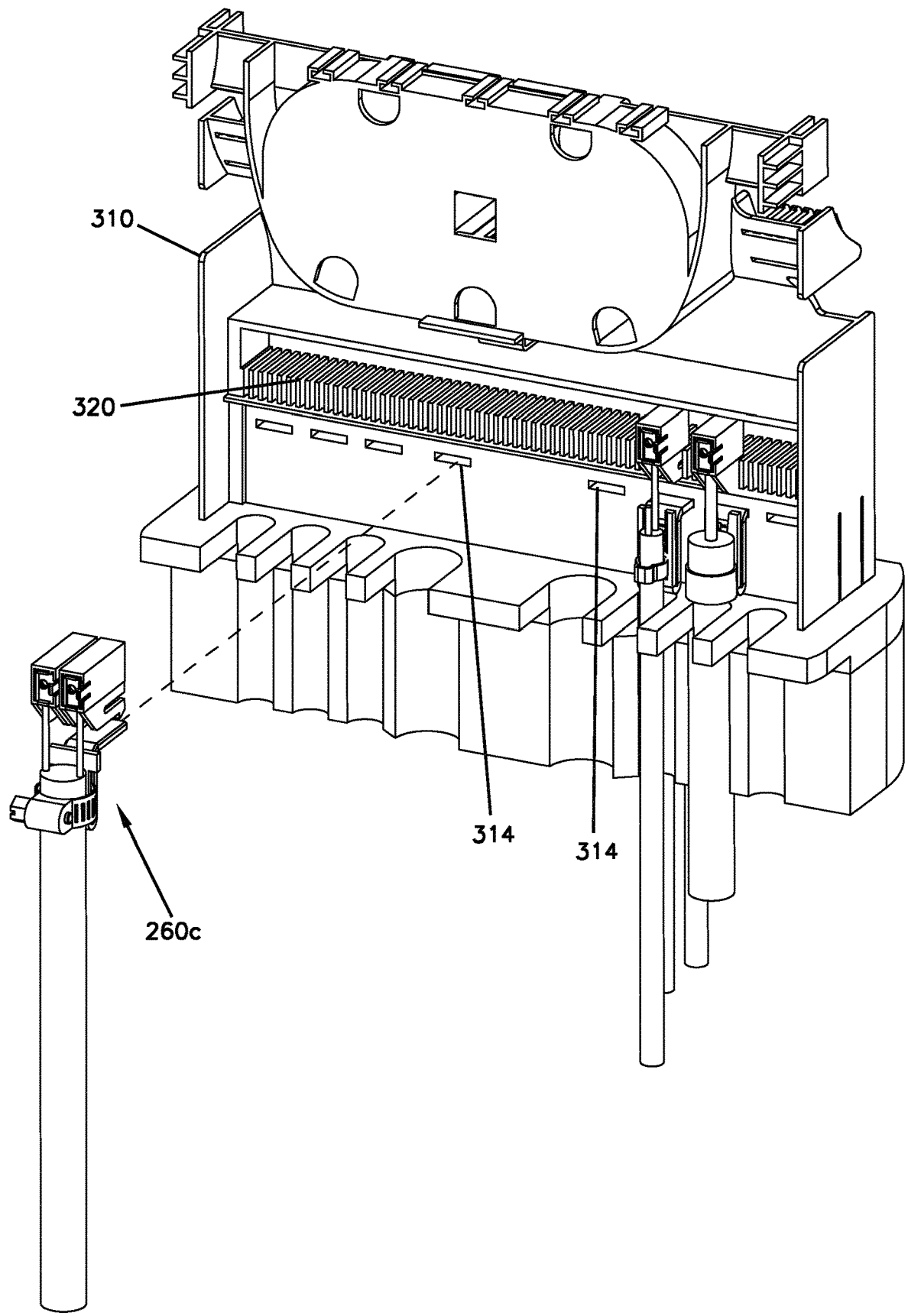
FIGS. 26-29 show the clamp assemblies of FIGS. 17-26 being mounted to an interior frame of a telecommunications enclosure.
Figure 27:
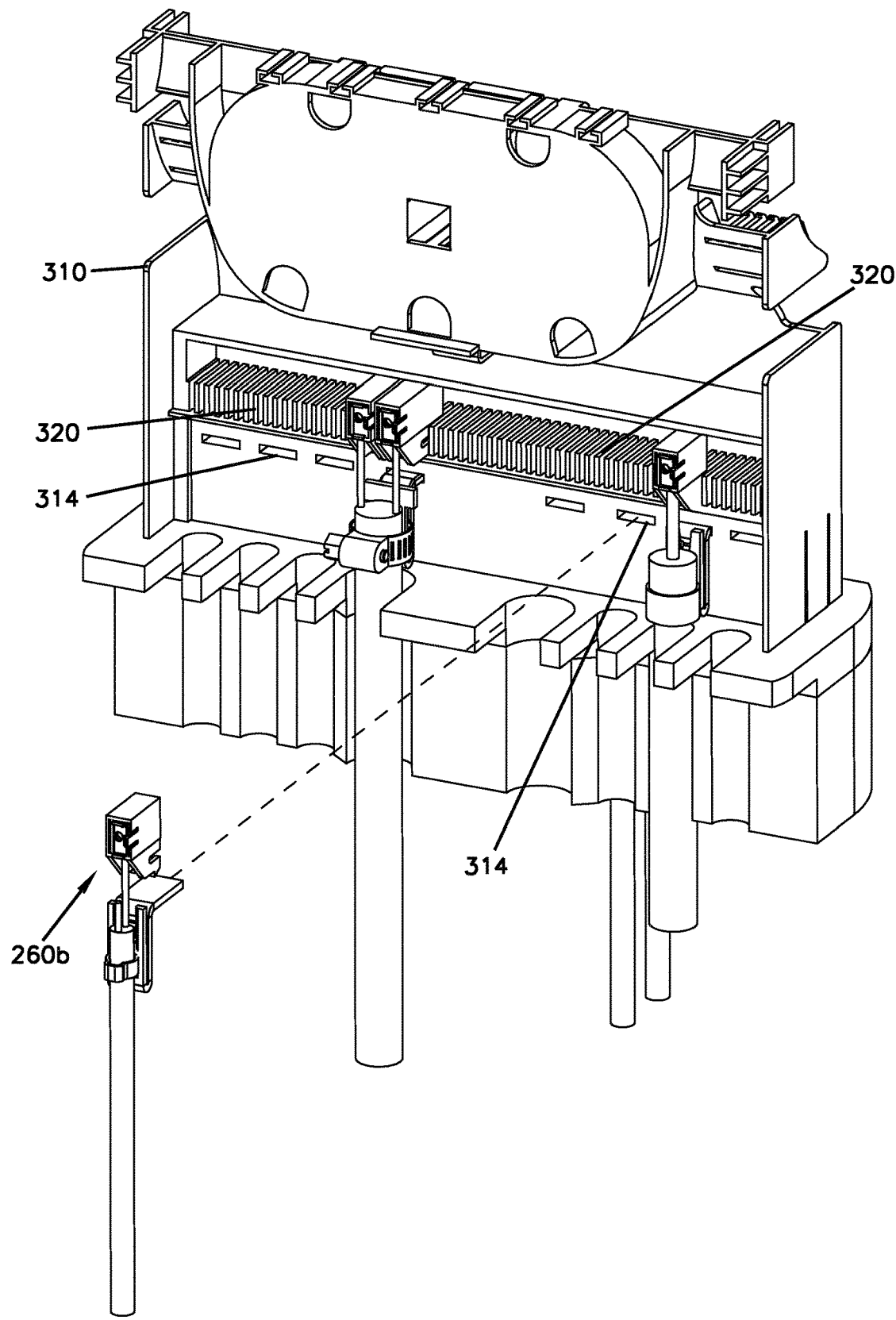
Figure 28:
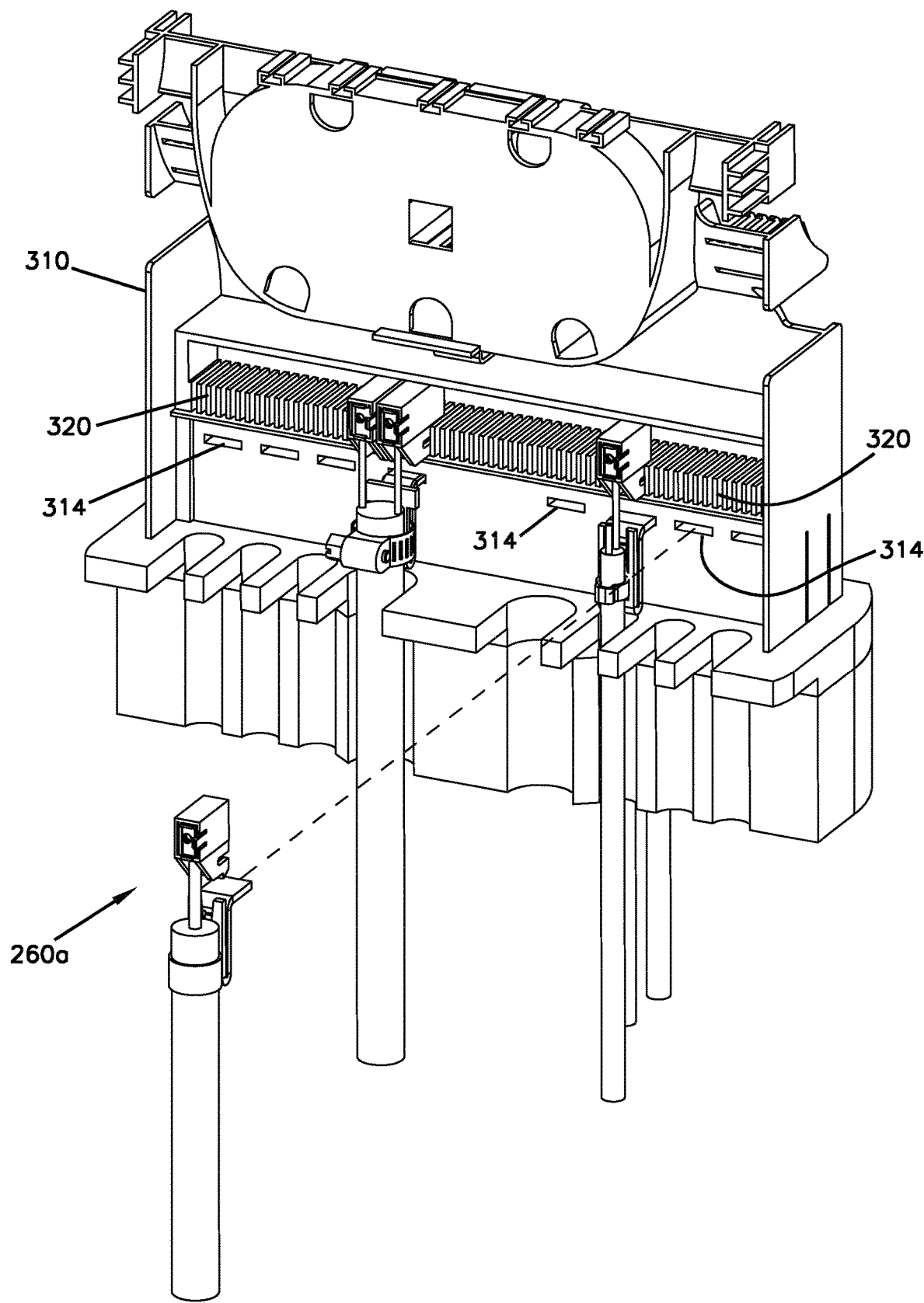
Figure 29:
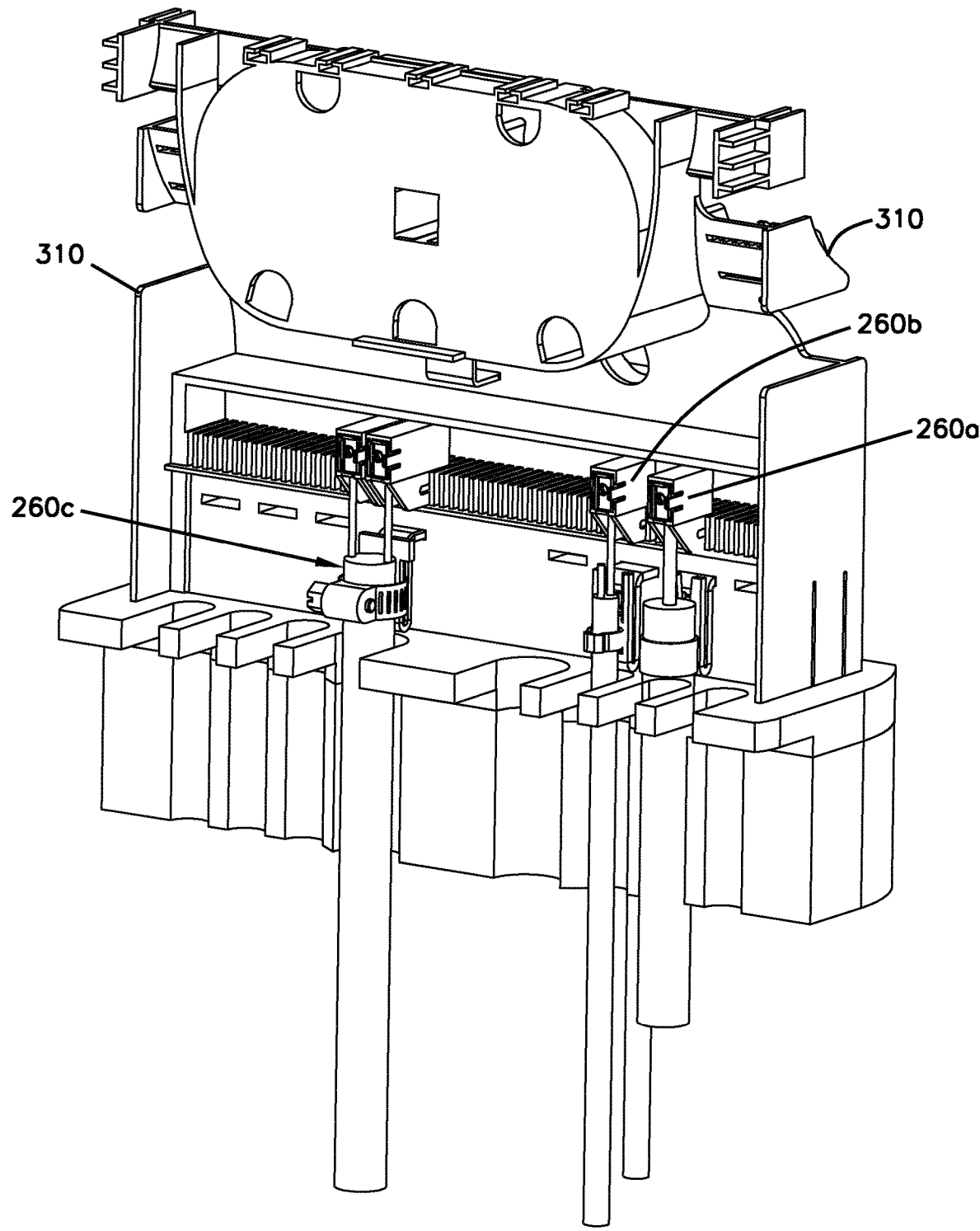
Figure 32:
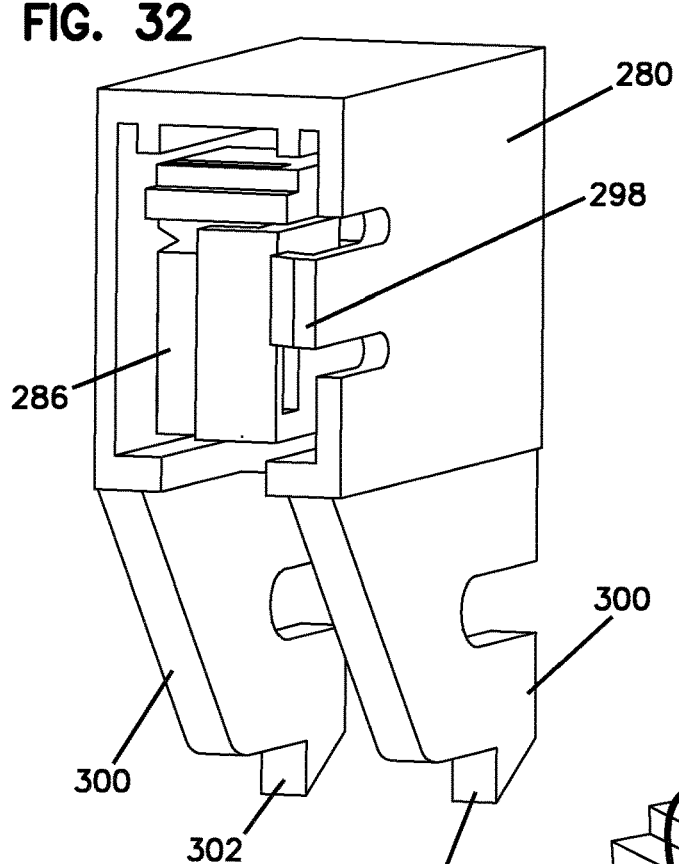
FIG. 32 shows an alternative embodiment of a strength member clamp assembly.
Figure 33:
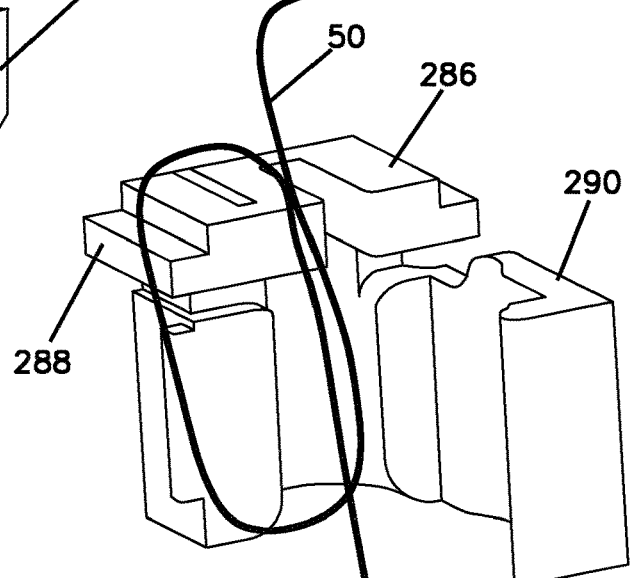
FIG. 33 shows an interior element of the strength member clamp assembly of FIG. 32 in an open position with a flexible strength member being wrapped.
Figure 34:
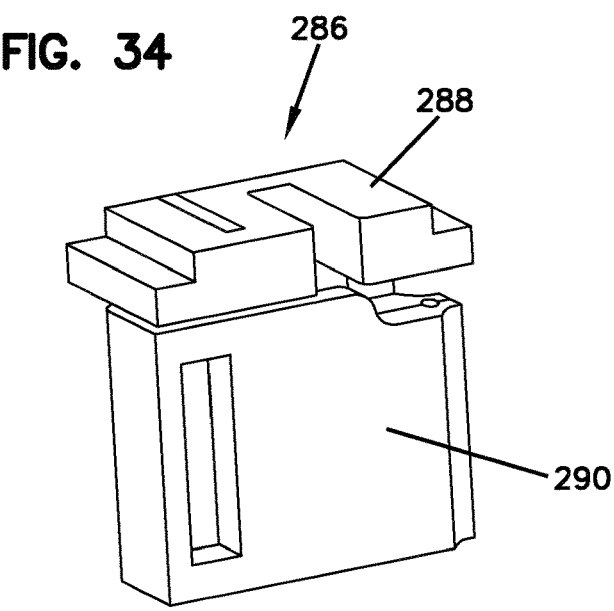
FIG. 34 is a view of the internal component of FIG. 33 shown in the closed position.

Referring now to FIGS. 1-9, a closure 10 is shown including a cover 20 with an interior frame 30. Frame 30 holds telecommunications equipment 32, such as a plurality of trays 34 in the example shown. Various cables 46 enter and exit closure 10 through a gel block or seal block 40. Seal block 40 has first and second portions 42, 44, which together seal around cables 46. The frame 30 includes a clamp assembly holder 36 for holding a cable clamp assembly 60 attached to each cable 46 to retain each cable 46 with closure 10.

One issue for proper sealing of closure 10 relates to the seal associated with seal block 40 around each cable 46. In some cases, seal block 40 includes a seal having an opening for each cable 46. Should cable 46 be misaligned with the cable opening of the seal block, a possible leak source could be created. Compare FIGS. 35 and 36.

Each cable 46 includes a cable jacket 48 which surrounds one or more fiber optic cables 52, or tubes containing fibers. Cable 46 also includes one or more strength members 50. The strength members 50 can be glass-filled rods and/or flexible yarns.

In one example, a clamp assembly 60 is provided to clamp to cable 46 and be retained by clamp assembly holder 36 of closure 10. Clamp assembly 60 includes a main body 62 with a jacket clamp assembly 64 and a strength member clamp assembly 80 for clamping to a strength rod. In the example embodiment, jacket clamp assembly 64 and strength member clamp assembly 80 are part of the same clamp assembly 60 and are interconnected to one another.

Jacket clamp assembly 64 includes a first body 66 which is moveable relative to main body 62. A wrap 68 extends around jacket 48. Wrap 68 mounts to first body 66 with a first fastener 70 through aligned holes 74 in wrap 68. Wrap 68 is adjustable in length to accommodate different diameters for cable jacket 48. Holes 74 are elongated to facilitate ease of insertion of first fastener 70. A second fastener 72 mounts the first body 66 to main body 62. Second fastener 72 mounts cable 46 tight to main body 62. The jacket clamp assembly 64 provides for clamping to a variety of different cable sizes with a single jacket clamp assembly. See FIGS. 9 and 26-31.

Strength member clamp assembly 80 includes a second body 82 which is moveable relative to main body 62 perpendicularly relative to the cable axis. Second body 82 is mounted to strength member 50 with a third fastener 84. The strength member clamp assembly 80 can mount to a variety of strength members in different positions. See FIGS. 9 and 26-31.

Once assembled, clamp assemblies 60 are placed in clamp assembly holders 36 and retained in pockets 38, such as by clips 54 in slots 86 in main body 62. Cable 46 is restrained in the X and Y directions. Cable 46 can move as necessary to centralize relative to seal block 40 in the Z direction. See FIG. 2B.

First body 66 includes flanges 90 which are guided by guides 92 for linear movement toward and away from cable 46. Second body 82 includes flanges 94 which are guided by guides 96 for linear movement toward and away from strength member 50. Wrap 68 includes a loop 98 and a coextensive portion 100. Coextensive portion 100 includes aligned parallel strips of wrap 68 positioned in contact with one another.

Referring now to FIGS. 10-16, an alternative clamp assembly 160 with a similar jacket clamp assembly 164 and with a differently constructed strength member clamp assembly 180 is shown. Main body 162 includes an end flange 166. Strength member clamp assembly 180 includes a second body 182 including a slot 184 for receiving end flange 166. Second body 182 includes a pocket 186 for receiving a block 188 having a hole 190 therethrough. A clamp bar 192 is positioned within block 188. A fastener 196 mounts clamp bar 192 and block 188 to strength member 50. In this example embodiment, jacket clamp assembly 164 and strength member clamp assembly 180 are part of the same clamp assembly 160 and are interconnected to one another. The strength member clamp 180 works in a similar manner to mount to a variety of strength members in different positions.

Referring now to FIGS. 17-34, another example embodiment of a clamp assembly 260 is shown where the jacket clamp assembly 264 is separate from the strength member clamp assembly 280. Several different but related embodiments 260a, 260b, and 260c are shown. Jacket clamp assembly 264 includes a body 262 and an adjustable jacket clamp 268. The embodiments 260a, 260b, and 260c differ in the manner or clamping to the cable jacket with jacket clamp assemblies 264a, 264b, and 264c. Body 262 includes an extending flange 270. Jacket clamp assembly 264a includes an omega shaped ring 420 mounted to a tapered slot 424 and a clip 426 of body 262. Jacket clamp assembly 264b includes a compressible ear ring 430 with a plate 432 mounted to a slot 434 and a clip 436 of body 262. Jacket clamp assembly 264c includes an adjustable hose clamp 440 mounted to a T bar 442 on body 262. The jacket clamp assembly 264 provides for clamping to a variety of different cable sizes with a single jacket clamp assembly. Alternatively, wrap 68 and jacket clamp assembly 64 can be used.

Strength member clamp assembly 280 includes a body 282 including a pocket 284 for holding a block 292 and a clamp bar 294. A fastener 296 fastens clamp bar 294 and block 292 to strength member 50. Alternatively, pocket 284 receives a yarn clamp 286. Yarn clamp 286 includes a wrap area 288 and a door 290. Either yarn clamp 286 or block 292 with clamp bar 294 are received in pocket 284 and held in place by a clip 298. Two strength member clamp assemblies 280 can be used if two strength members 50 are provided. See FIG. 23.

Alternatively, a single strength member clamp assembly 280 can be used even if two strength members are provided. See FIG. 20. Further, alternatively, strength member clamp assembly 80 could be used.

Body 282 of strength member clamp assembly 280 includes tabs 300 and clips 302. Frame 310 includes slots 314 for flanges 270, and walls 320 for receiving tabs 300 and clips 302. In this manner cable 46 is restrained in the X and Y directions. Cable 46 can move as necessary to centralize relative to seal block 40 in the Z direction. More walls 320 are provided than slots 314, to allow for more positions of strength member clamp assembly 280 relative to jacket clamp assembly 264. This allows for linear positioning of the strength member 50.

Figure 35:
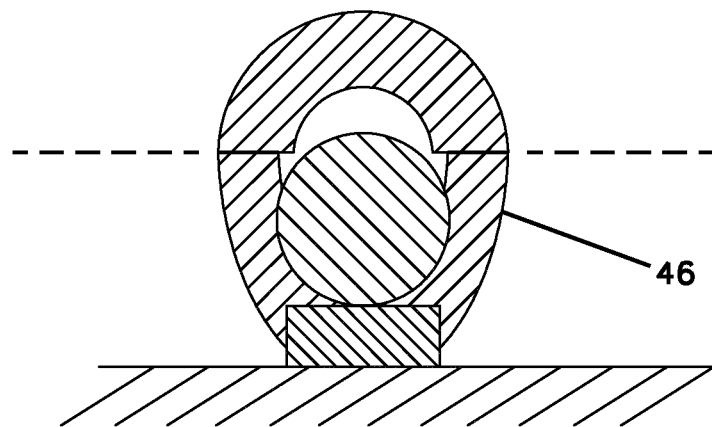
FIG. 35 shows cable and gel block misalignment if the cable is restricted relative to the fixed wall.
Figure 36:
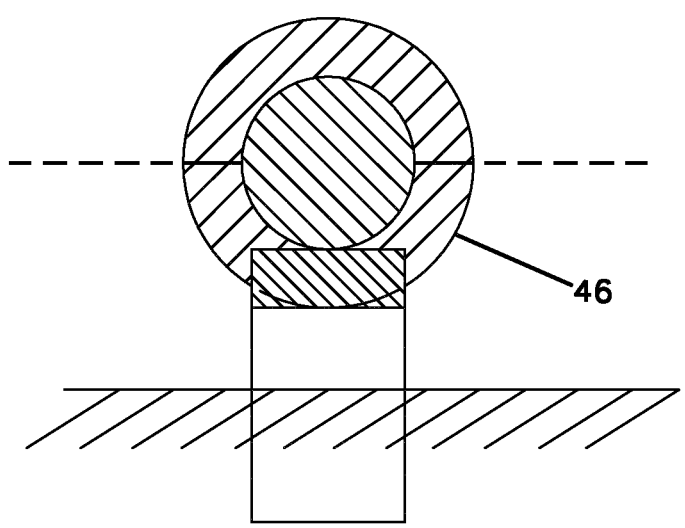
FIG. 36 shows better cable and gel block alignment when the cable is moveable relative to the fixed wall.
Figure 37:
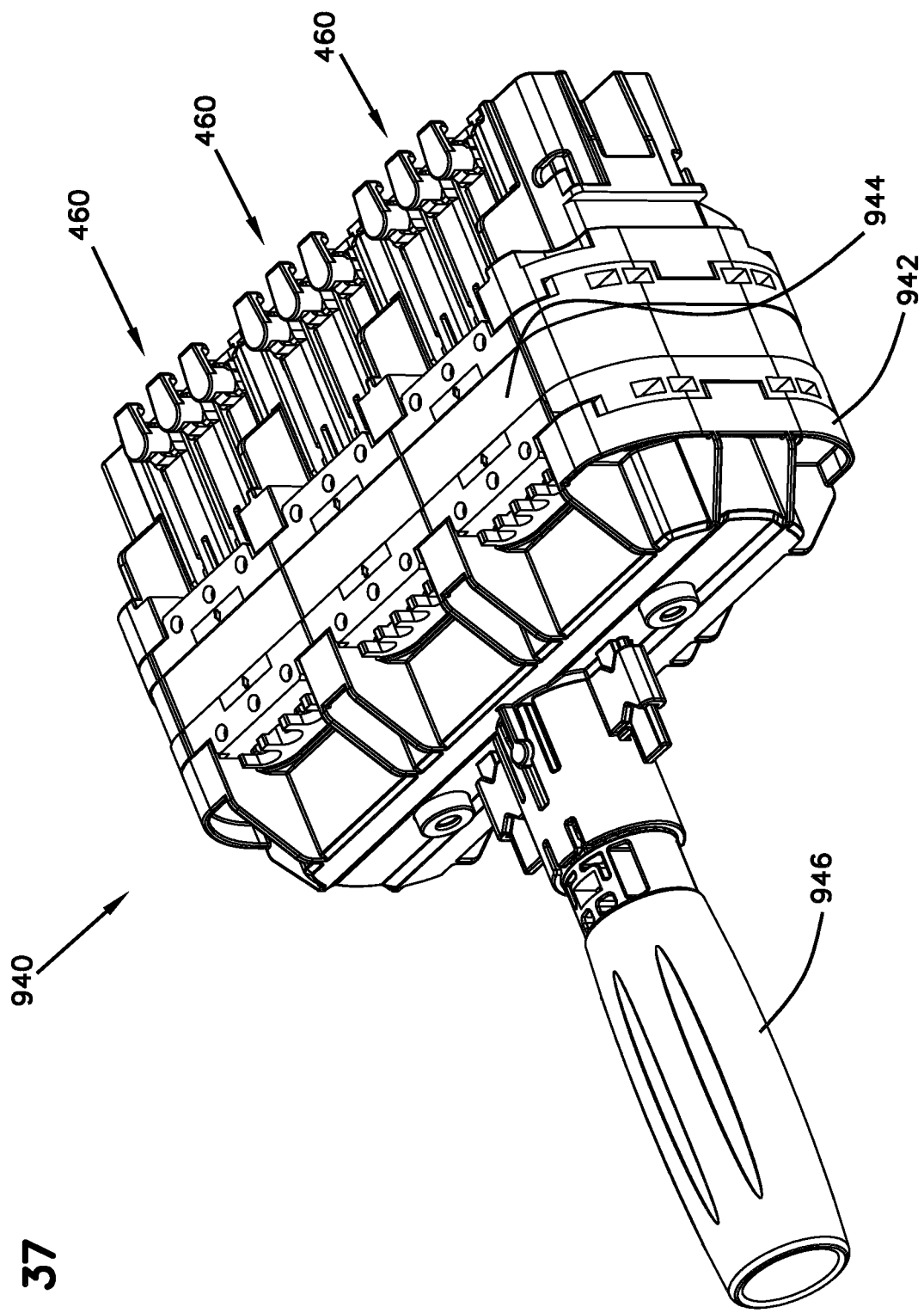
FIG. 37 is a perspective view of a seal block including alternative clamp assemblies.
Figure 38:
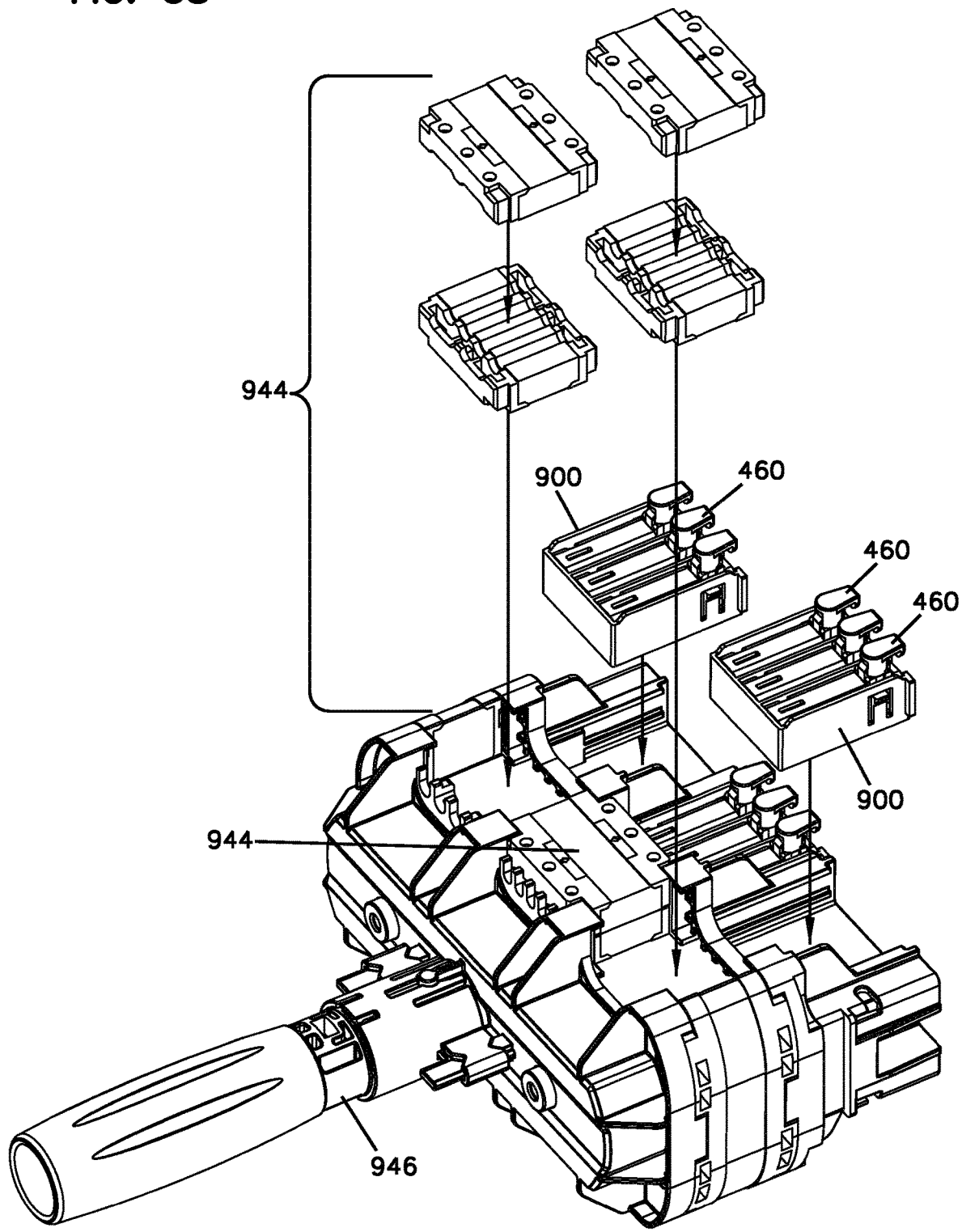
FIG. 38 is an exploded perspective view of the seal block of FIG. 37.
Figure 39:
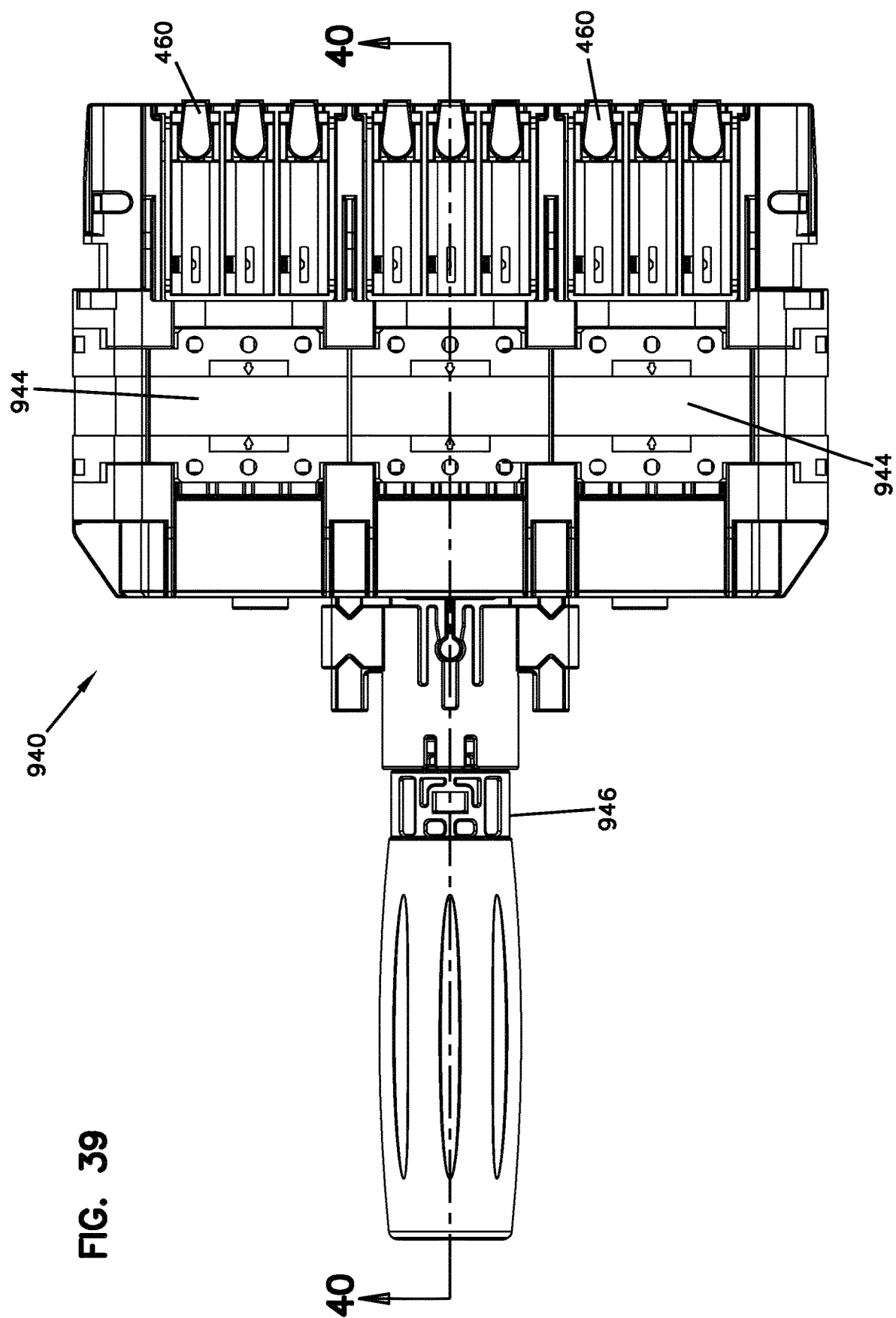
FIG. 39 is a top view of the seal block of FIG. 37.
Figure 40:
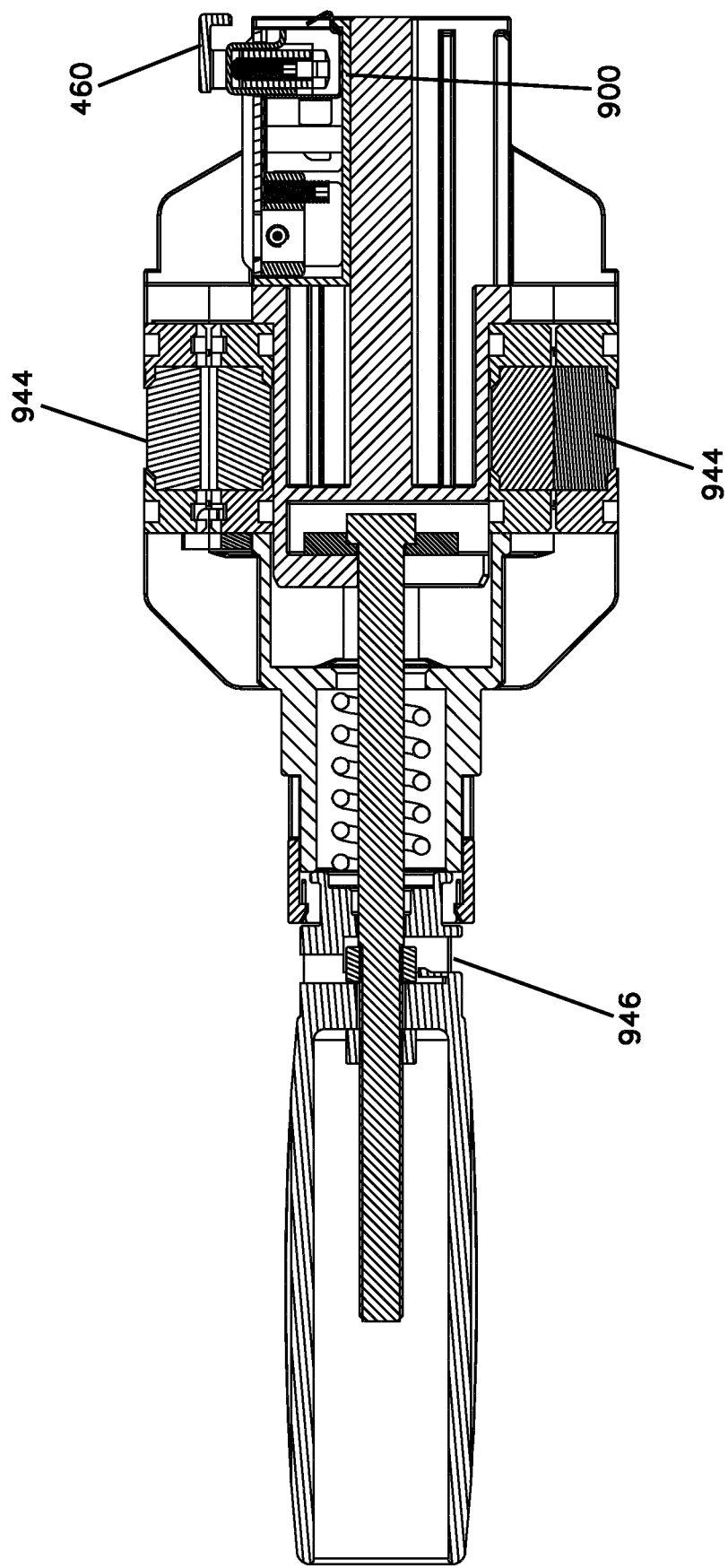
FIG. 40 is a cross-sectional view of the seal block of FIG. 37.
Figure 41:
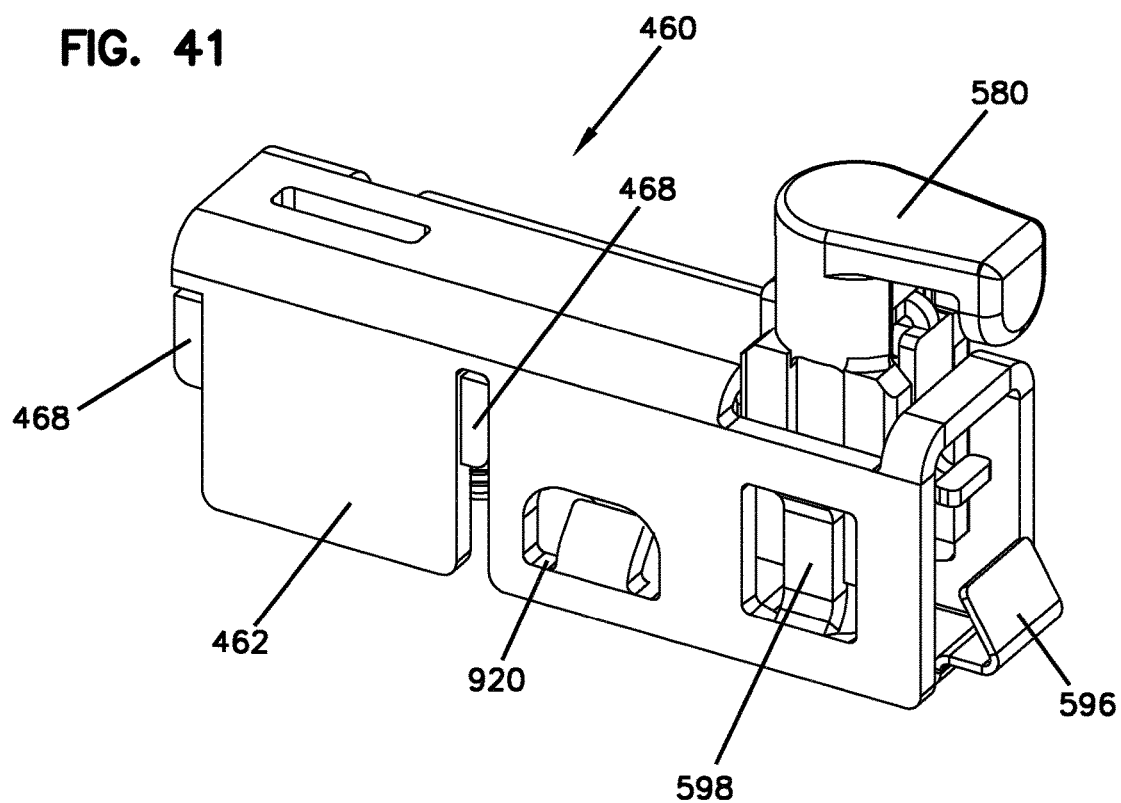
FIG. 41 is a perspective view of the alternative clamp assembly of FIG. 37.
Figure 42:
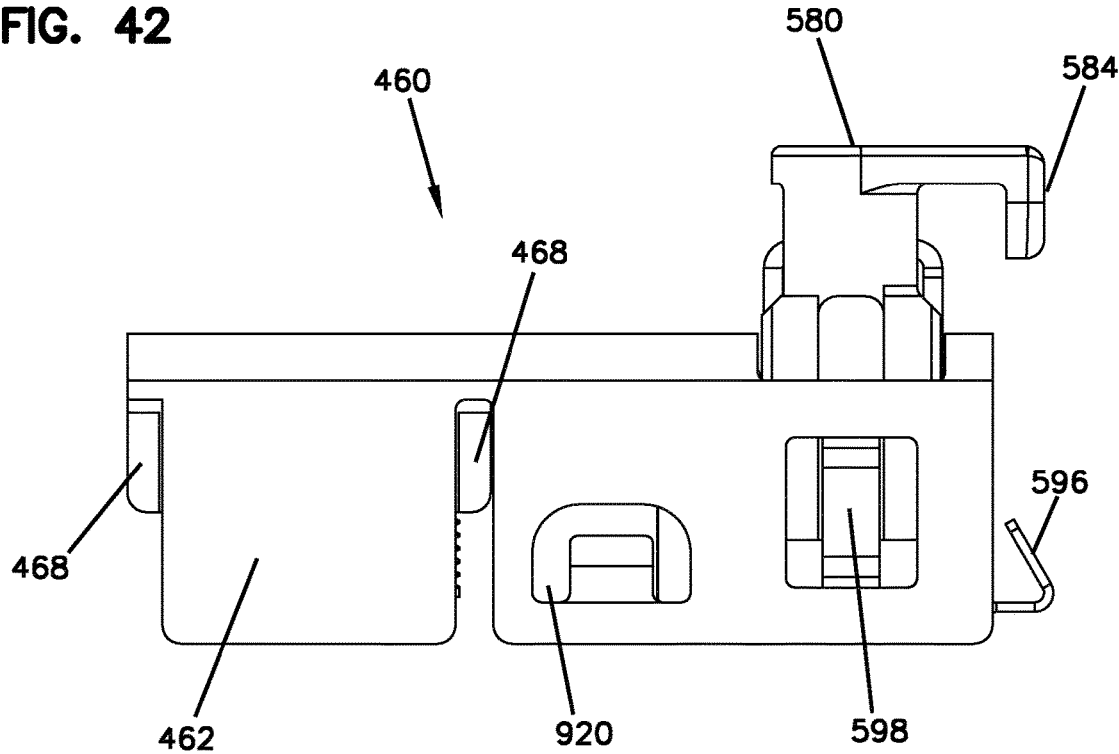
FIG. 42 is a side view of the clamp assembly of FIG. 41.
Figure 43:
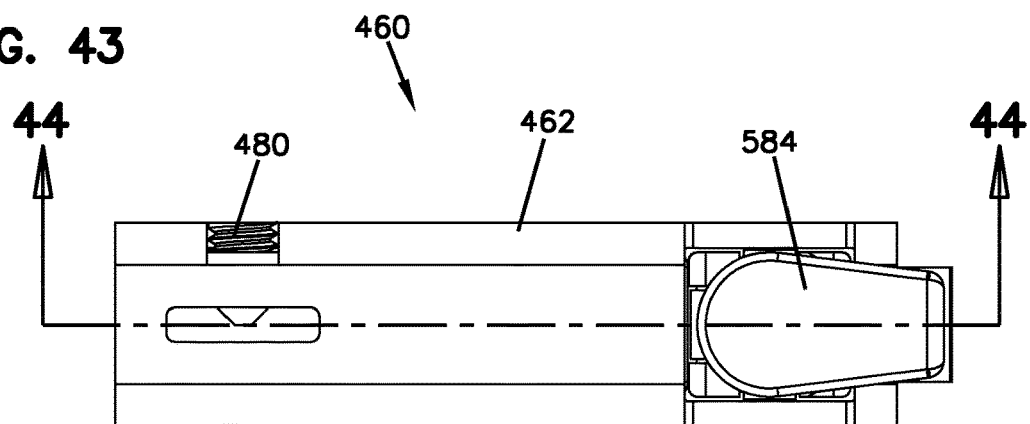
FIG. 43 is a top view of the clamp assembly of FIG. 41.
Figure 44:
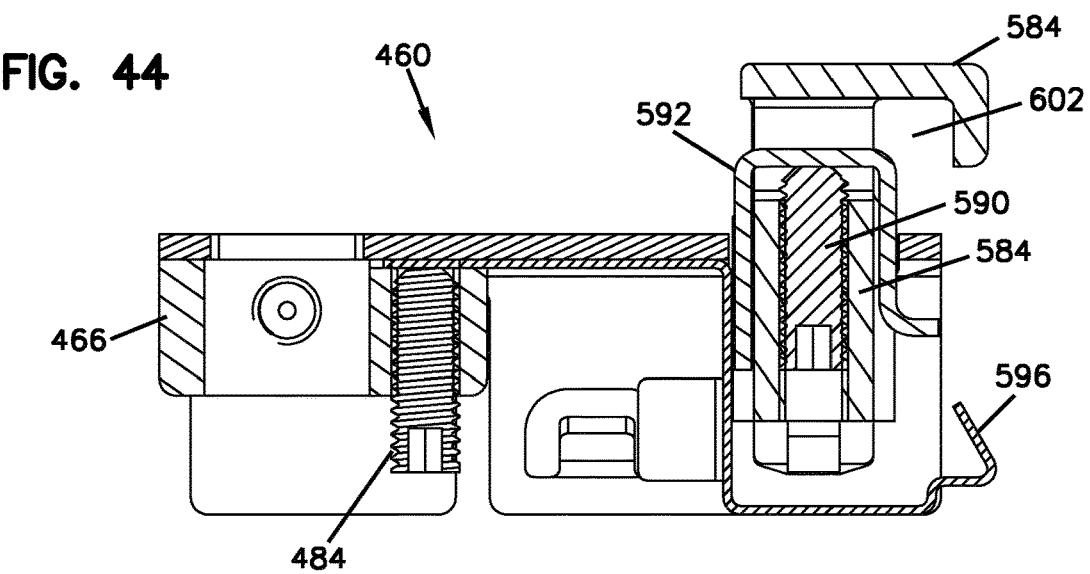
FIG. 44 is a cross-sectional side view of the clamp assembly taken along lines 44-44 of FIG. 43.
Figure 45:
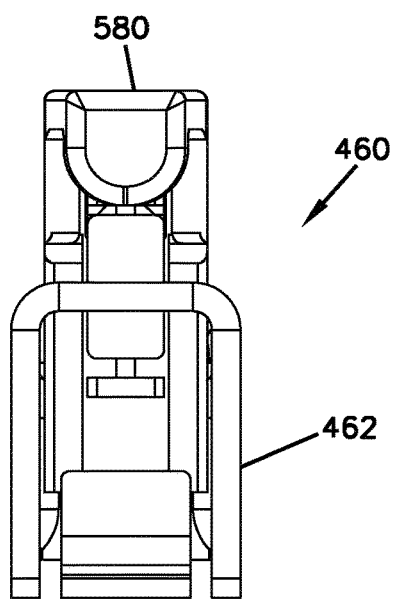
FIG. 45 is an end view of the clamp assembly of FIG. 41.
Figure 46:
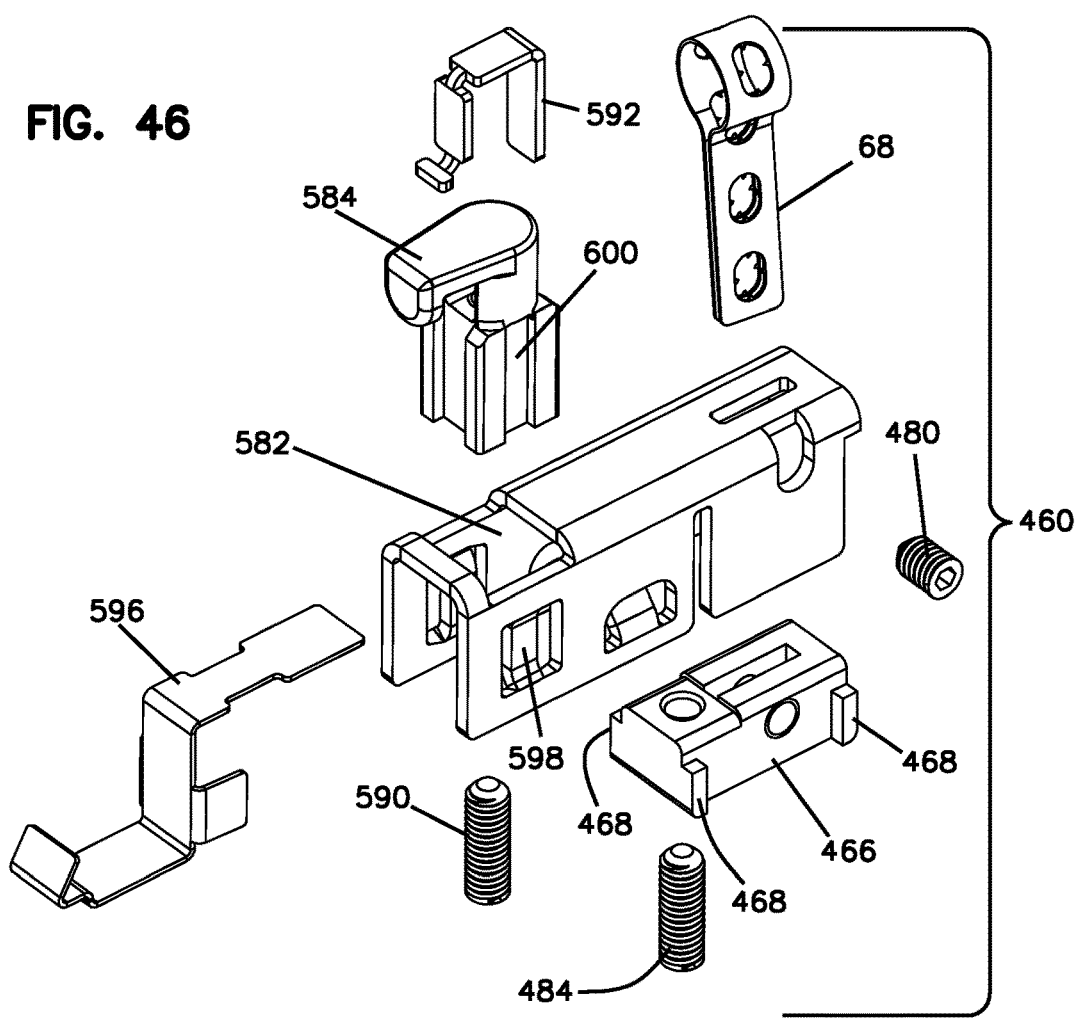
FIG. 46 is an exploded perspective view of the clamp assembly of FIG. 41.

FIGS. 35 and 36 show the advantages of allowing the cable 46 to float relative to a fixed frame with a fixed seal wherein the leak pathway is reduced or eliminated.

Other advantageous features include the ability to clamp to different sized jackets and/or different sizes and/or locations for strength members, such as the glass filled rods.

A further advantageous feature is that the cables can be clamped to the clamp assemblies 60, 160, 260 outside and separate from the closure 10. Such a feature promotes ease of use for the technician. Once the clamp assemblies are mounted to the cables, the cables and the clamp assemblies can be mounted to the closure. Such a feature is also useful for later working on a cable if the closure needs to be re-entered.

Referring now to FIGS. 37-48, an alternative clamp assembly 460 is shown. FIGS. 37-40 show a seal block 940 with a sealing unit 942 and cable sealing modules 944 for sealing to cables entering the closure. Actuator or trigger 946 causes sealing unit 942 to seal to the cables. Clamp assemblies 460 clamp the cables to the seal block 940.

Alternative clamp assembly 460 includes a main body 462 which receives a first body 466. Projections 468 are positioned along slots 470. A first fastener 480 is used to hold wrap 68 in position. A second fastener 484 moves first body 466 to cause tightening of wrap 68 around cable 46. A strength member clamp assembly 580 is mounted in pocket 582 and includes a cover member 584 which is pressed against strength member 50 by third fastener 590 and pressing element 592. Cover member 584 is L-shaped. Tabs 598 define projections for slots 600 in cover member 584. Cover member 584 defines a strength member pocket 602 for a strength member of the cable. A grounding clip 596 can be included to allow for grounding of a metallic shield of cable 46 to a ground connection associated with the frame.

First fastener 480 is inserted fully into an interior of main body 462 and resides in first body 466 to the lock to wrap 48 and allow for tightening of wrap 48 by second fastener 484.

Figure 49:
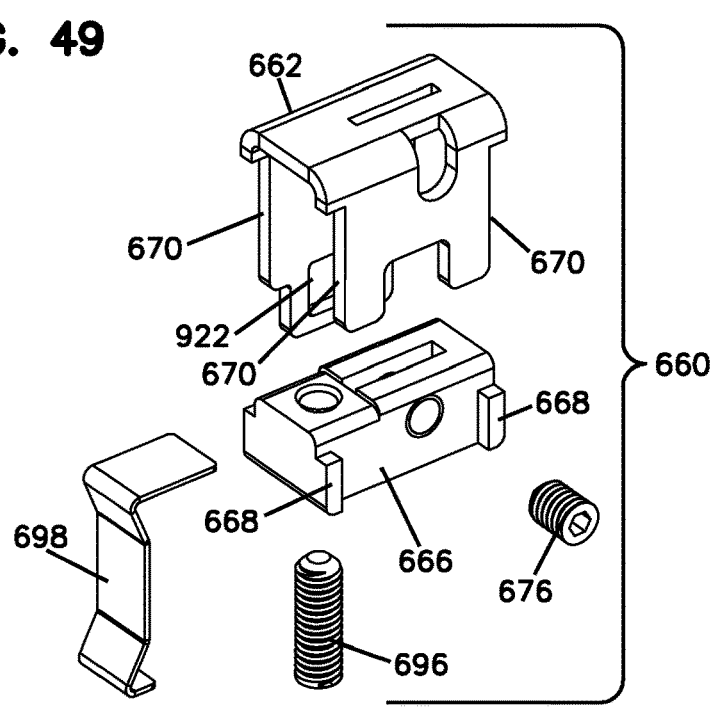
FIG. 49 is an exploded view of an alternative clamp assembly not including a strength member clamp assembly.
Figure 47:
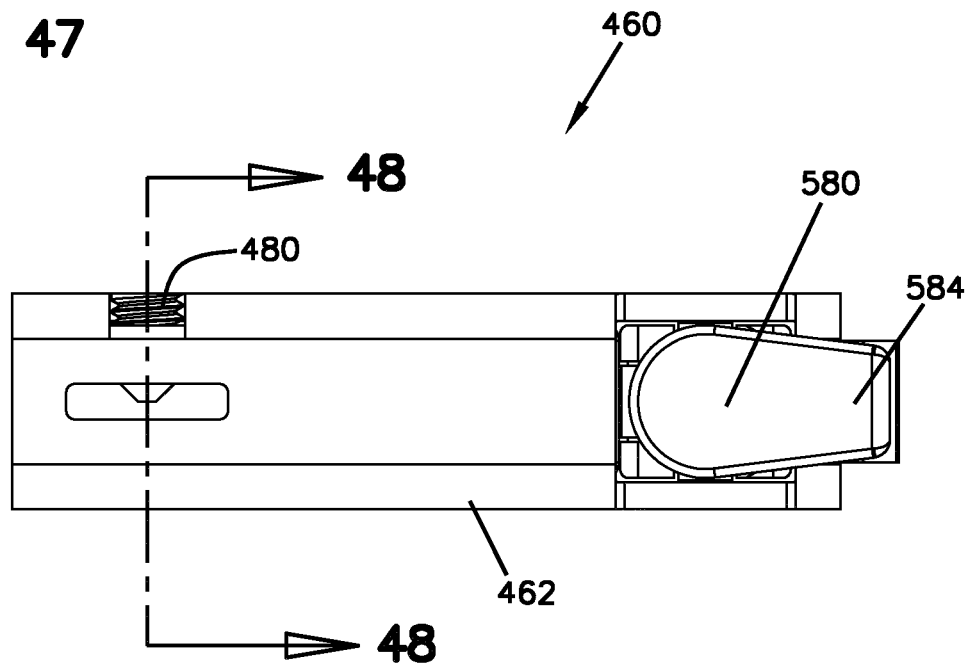
FIG. 47 is a further top view of the clamp assembly of FIG. 41.
Figure 48:
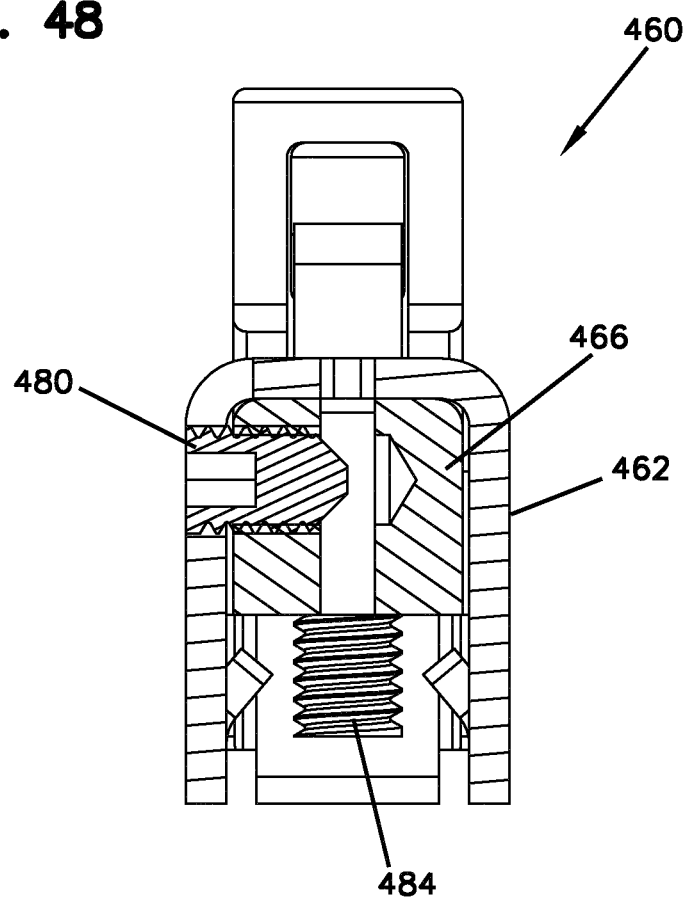
FIG. 48 is a cross-sectional end view of the clamp assembly of FIG. 47, taken along lines 48-48.
Figure 50:
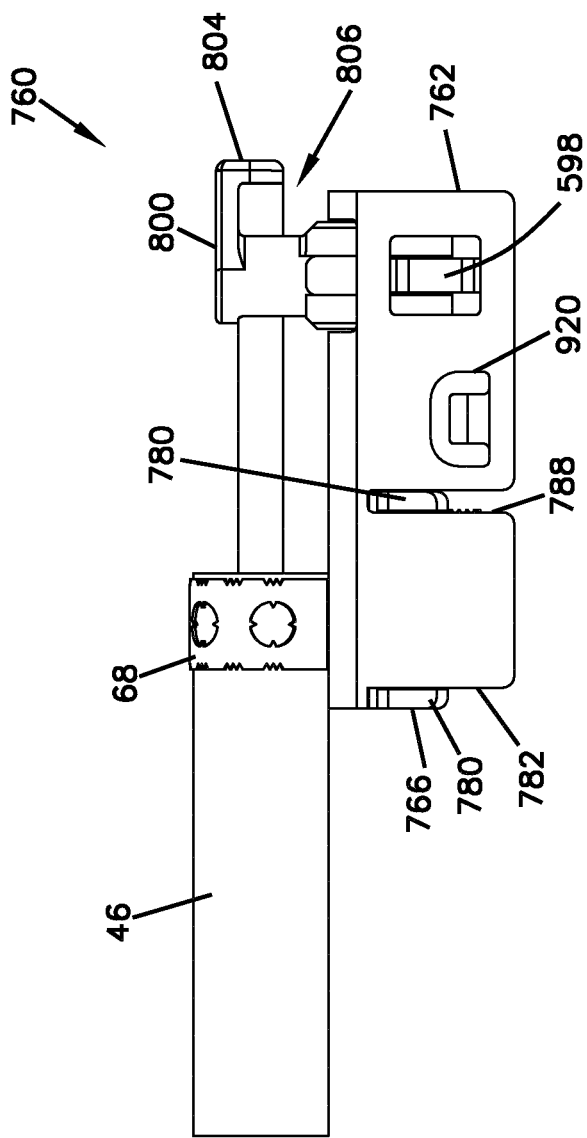
FIG. 50 is a side view of another embodiment of a clamp assembly showing a cable mounted to the clamp assembly.
Figure 51:
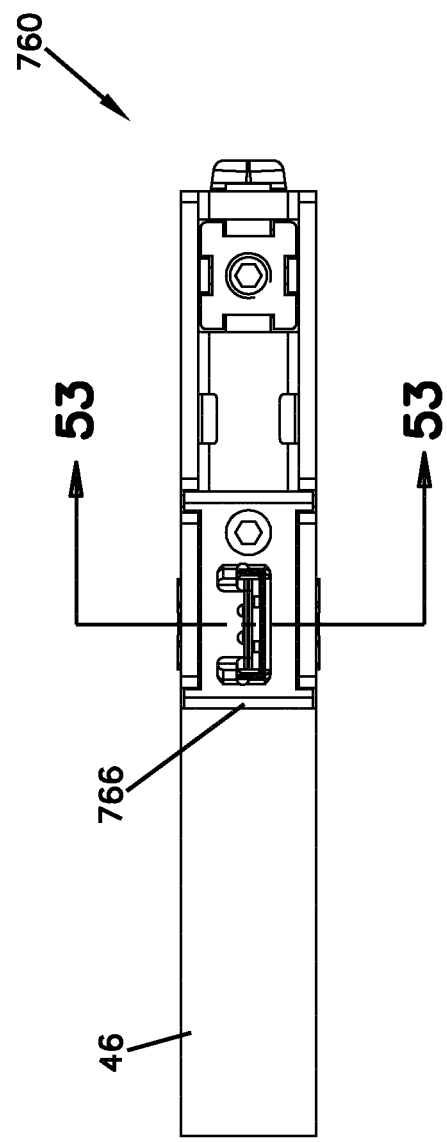
FIG. 51 is a bottom view of the cable and clamp assembly of FIG. 50.
Figure 53:
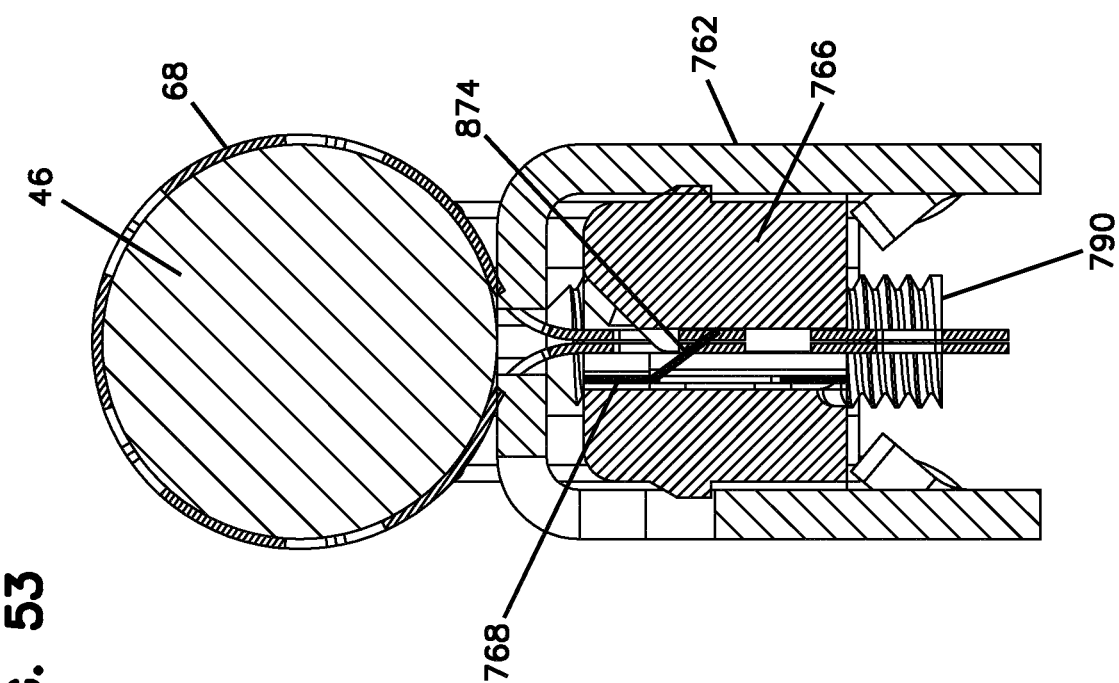
FIG. 53 shows the view of FIG. 52, with the wrap in the tightened position.
Figure 52:
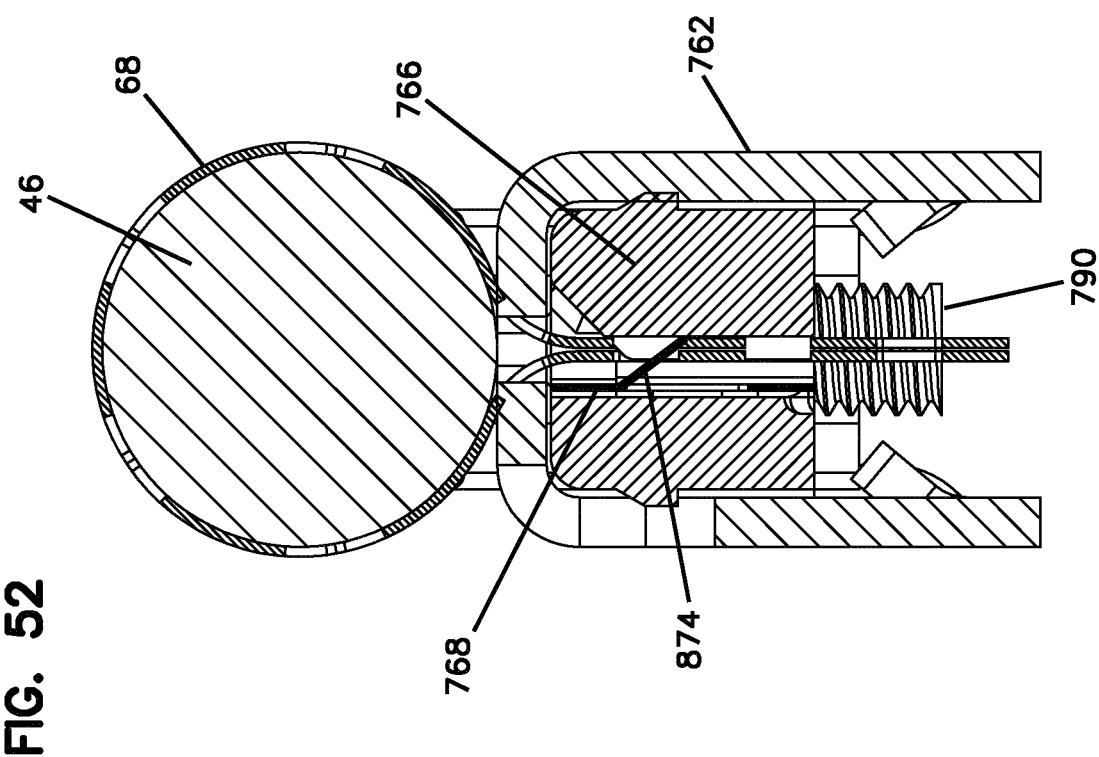
FIG. 52 is a cross-sectional view along lines 52-52 showing the wrap around the cable not yet tightened.
Figure 54:
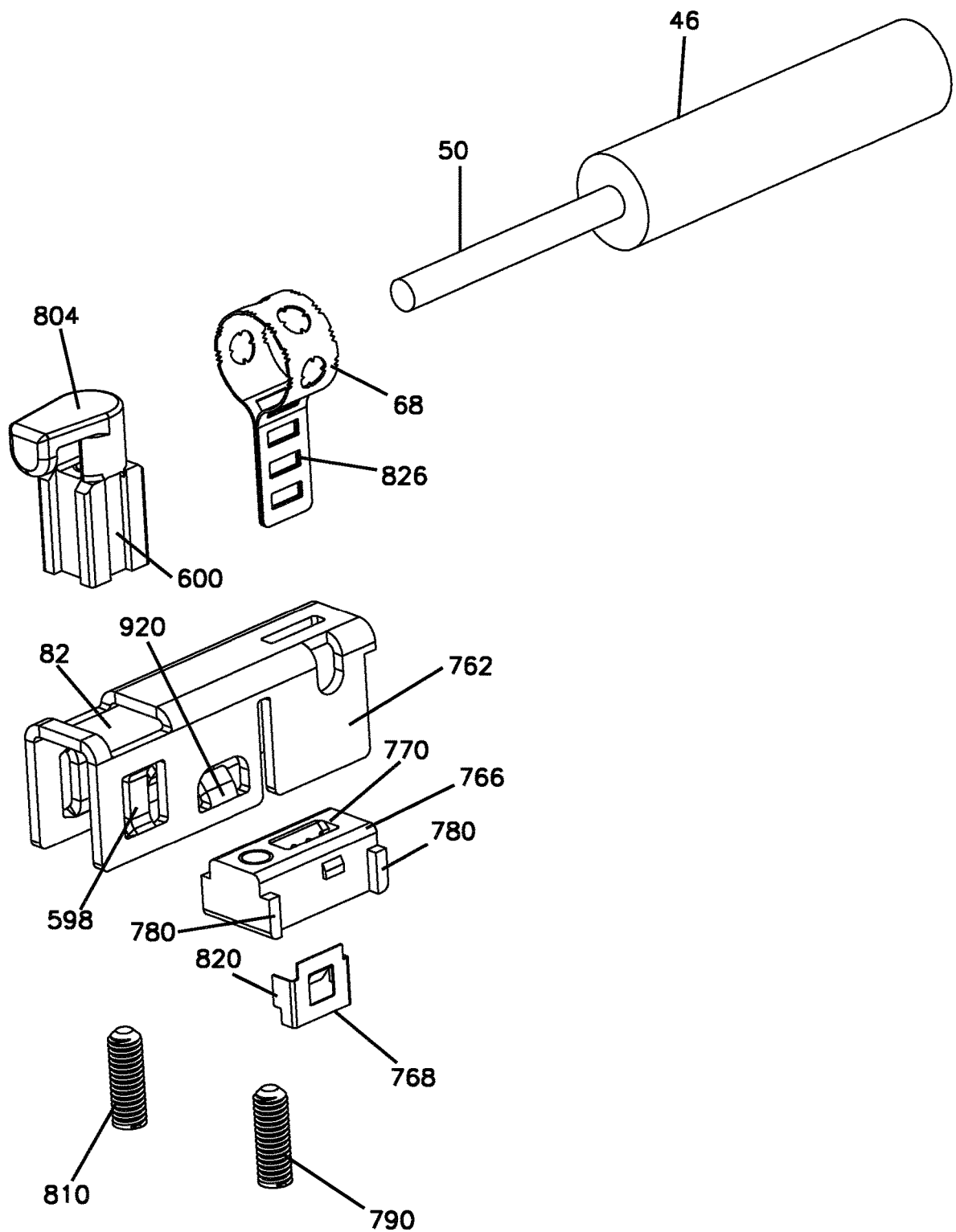
FIG. 54 is an exploded perspective view of the cable and clamp assembly of FIG. 50.

Referring now to FIG. 49, an alternative clamp assembly 660 is shown including a main body 662 which receives first body 666. Projections 668 reside in slots 670. A first fastener 676 is used to tighten against wrap 68. A second fastener 696 pushes first body 666 away from main body 662. No strength member clamp is provided in clamp assembly 660. A grounding clip 698 is positioned to contact a metallic shield of cable 46.

Referring now to FIGS. 50-54, an alternative clamp assembly 760 is shown. A main body 762 receives a first body 766 and a clip 768 for receiving wrap 68. Clip 768 is received within a main slot 770 of main body 762 and retained therein. First body 766 includes projections 780 which reside in slots 782, 788. First fastener 790 causes tightening of wrap 68 around cable 46. See FIGS. 52 and 53. Wrap 68 includes clip slots 826. Clip 768 includes ears 820 for retention in slot 770. Clip 768 includes a clip arm 874 for one-way clipping onto wrap 68. Alternative clamp assembly 760 includes a strength member clamp assembly 800 which receives the strength member 50 of cable 46. Main body 762 defines a pocket 802 for a cover member 804 for receiving an end of strength member 50 in a strength member pocket 806. A second fastener 810 controls the gripping of strength member 50.

Figure 55:
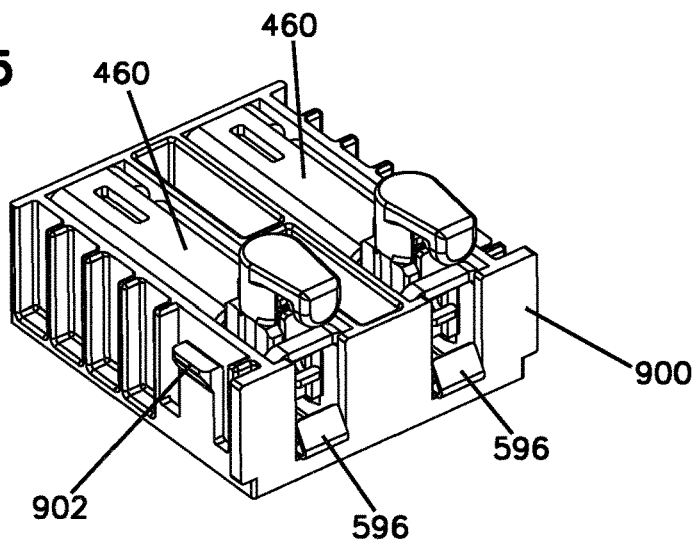
FIG. 55 is a perspective view of a clamp holder for holding two cable clamps of the type shown in FIG. 41.
Figure 56:
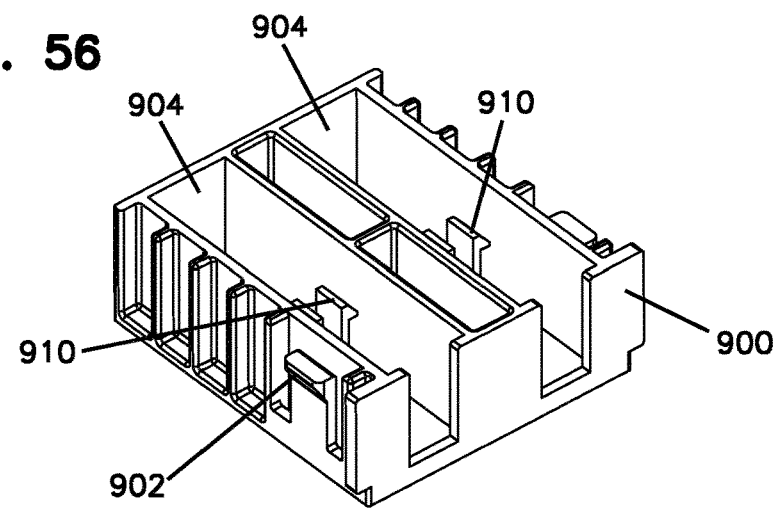
FIG. 56 shows the clamp holder of FIG. 55 without the clamp assemblies.
Figure 57:
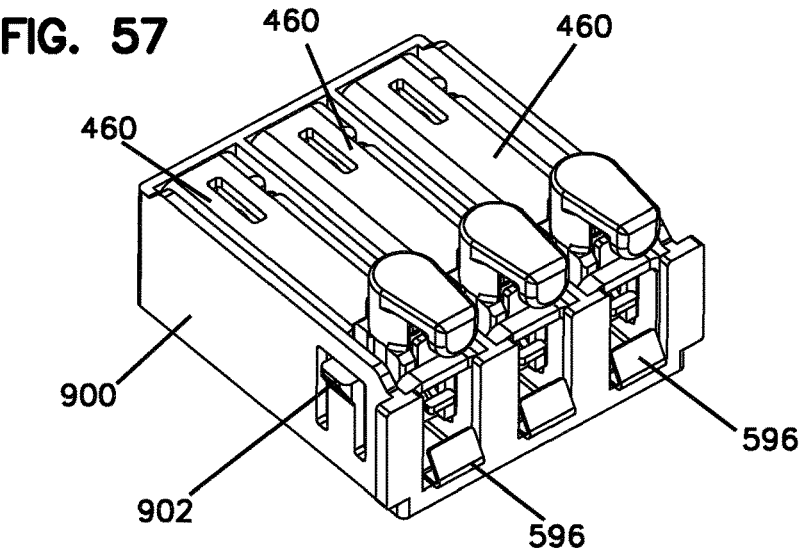
FIG. 57 is a perspective of another clamp holder, showing receipt of three clamp assemblies as shown in FIGS. 37-40.
Figure 58:
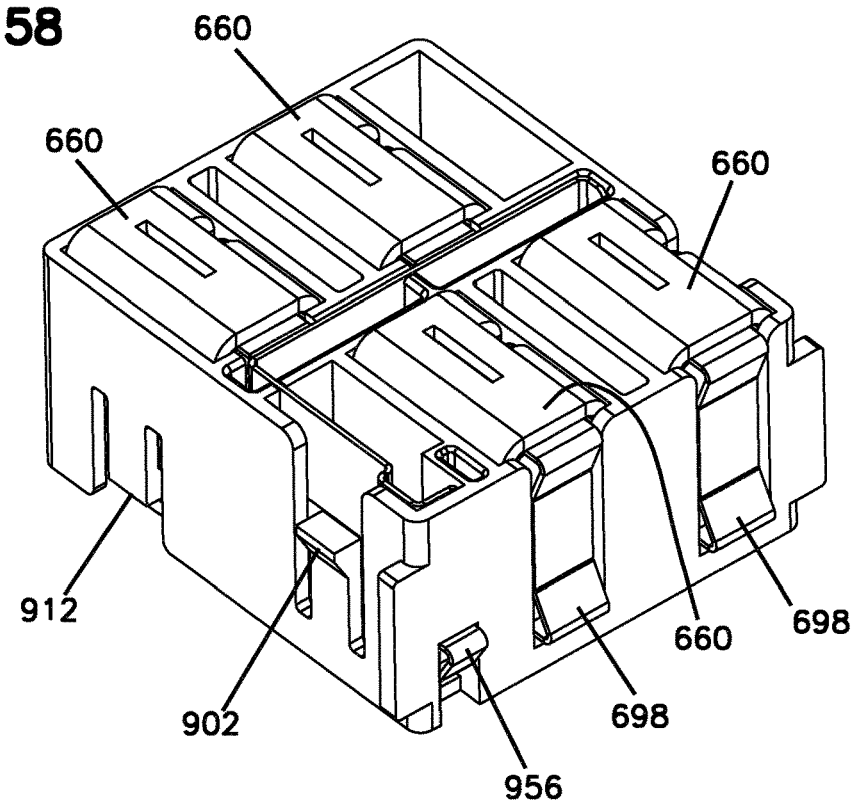
FIG. 58 shows in perspective view another clamp holder including four clamp assemblies of the type shown in FIG. 49.
Figure 59:
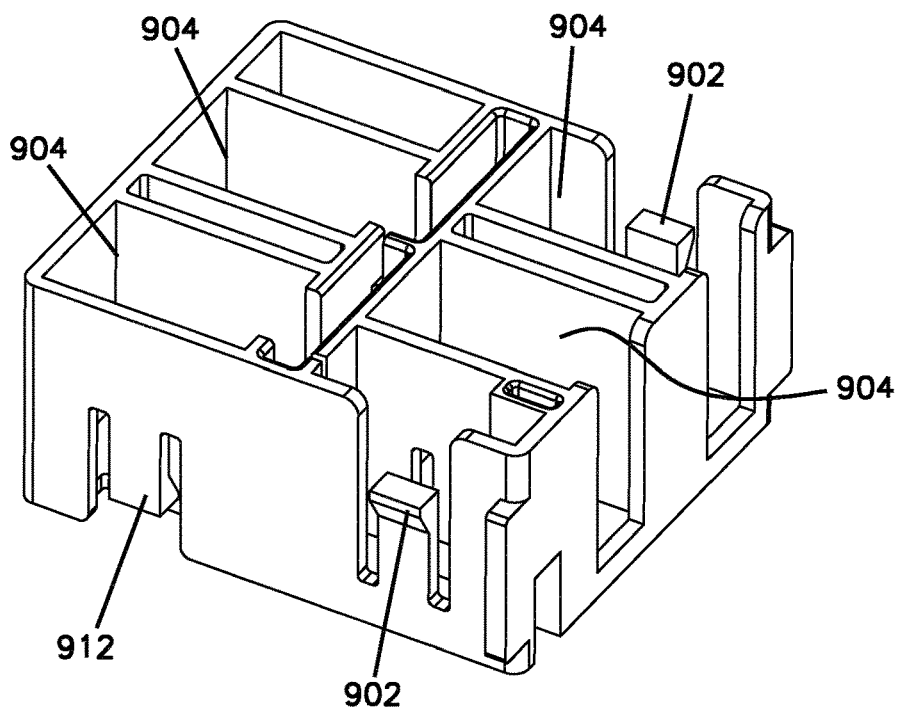
FIG. 59 shows the clamp holder of FIG. 58, without the clamp assemblies.
Figure 60:
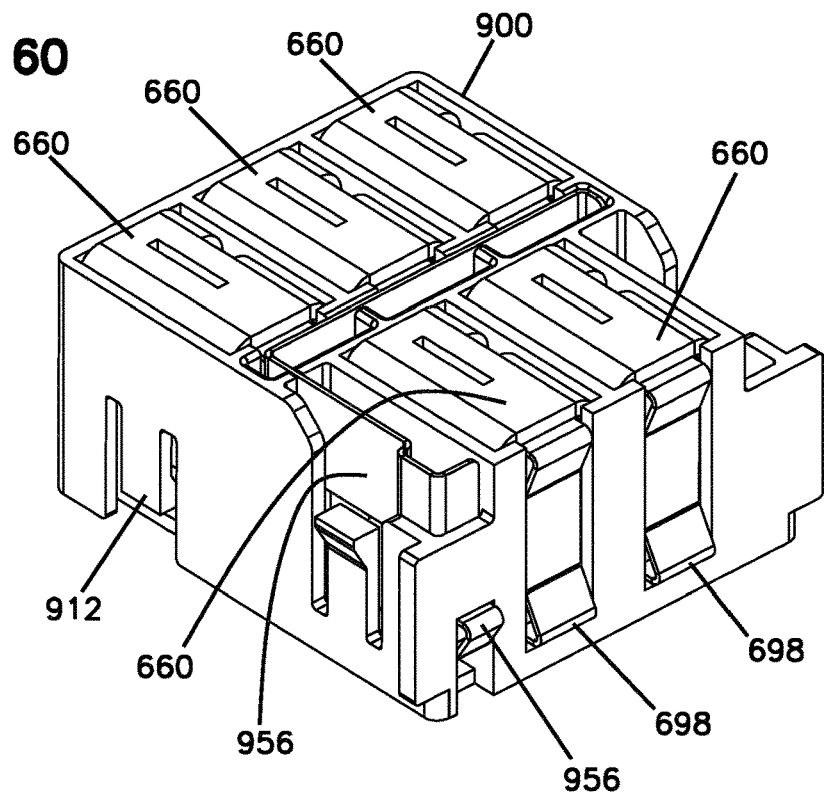
FIG. 60 is a perspective of another clamp holder including five clamp assemblies of the type of FIG. 49.
Figure 61:
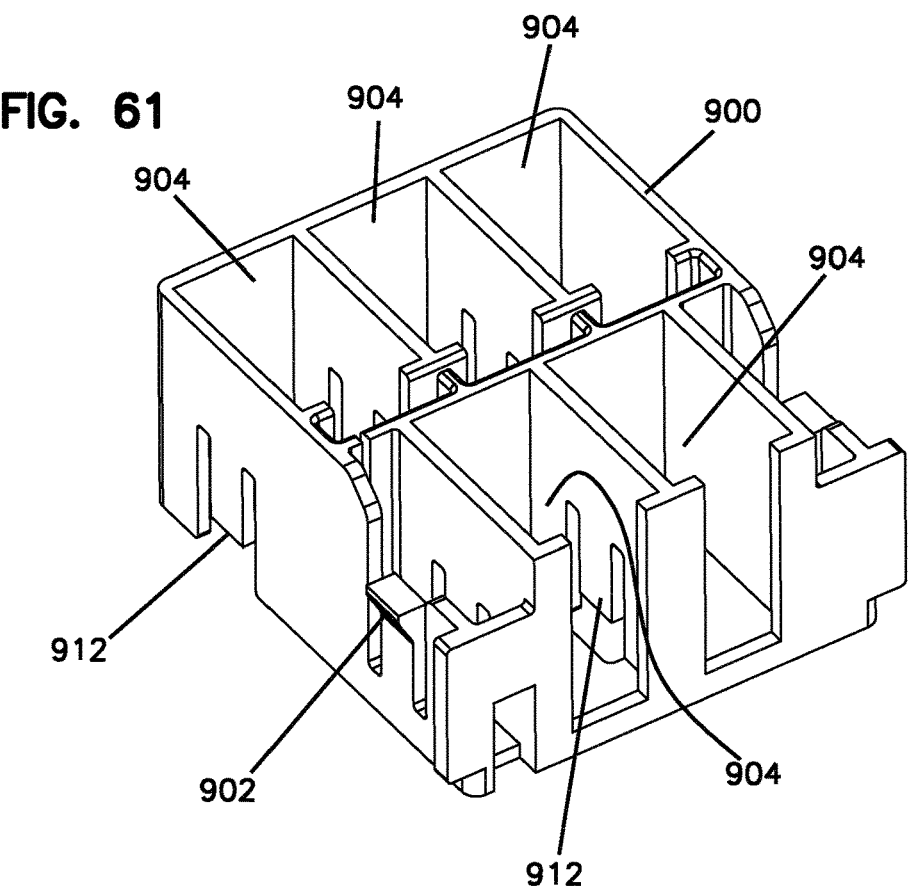
FIG. 61 shows the clamp holder of FIG. 60, without the clamp assemblies.

Referring now to FIGS. 55-61, a method of mounting cable clamp assemblies is shown. Various embodiments of a clamp holder 900 are shown. Clamp holder 900 snap fits to seal block 940 with clips 902. Each clamp holder 900 includes one or more pockets 904 for receipt of a cable clamp assembly. FIGS. 55 and 56 show receipt of two clamp assemblies 460. FIG. 57 shows receipt of three clamp assemblies 460. FIGS. 58 and 59 show receipt of four clamp assemblies 660. As shown, staggering is provided for increased density. FIGS. 60 and 61 show receipt of five clamp assemblies 660, and a different staggered arrangement. The grounding clips 596, 698, and 956 are exposed for contacting the grounding element on the frame.

Clamp holders 900 include clip arms 910, 912 which mount to apertures 920, 922 of clamp assemblies 460, 660, in two example implantations.

The various clamp assemblies allows for floating of the cable relative to a fixed frame with a cable seal. Other advantages include the ability to clamp to different sized jackets and/or clamping to the cables outside and separate from the closure before insertion into the closure.

PARTS LIST 10 closure
20 cover
30 frame
32 equipment
34 trays
36 clamp assembly holder
38 pocket
40 seal block
42 first seal portion
44 second seal portion
46 cables
48 jacket
50 strength member
52 fiber optic cables
54 clips
60 clamp assembly
62 main body
64 jacket clamp assembly
66 first body
68 wrap
70 first fastener
72 second fastener
74 holes
80 strength member clamp assembly
82 second body
84 third fastener
86 slots
90 flanges
92 guides
94 flanges
96 guides
98 loop
100 coextensive portion
X direction
Y direction
Z direction
160 alternative clamp assembly
162 main body
166 flange
180 alternative strength member clamp assembly
182 second body
184 slot
186 pocket
188 block
190 hole
192 clamp bar
196 fastener
260 alternative clamp assembly
260a, 260b, and 260c alternative clamp assemblies
264 jacket clamp assembly
264a, 264b, and 264c alternative jacket clamp assemblies
266 body
268 jacket clamp
270 extending flange
280 strength member clamp
282 body
284 pocket
286 yarn clamp
288 wrap area
290 door
292 block
294 clamp bar
296 fastener
298 clip
300 tabs
302 clips
310 frame
314 slots
320 walls
420 omega shaped ring
424 tapered slot
426 clip
430 ear ring
432 plate
434 slot
436 clip
440 hose clamp
442 T bar
460 alternative clamp assembly
462 main body
466 first body
468 projections
470 slots
480 first fastener
484 second fastener
580 strength member clamp assembly
582 pocket
584 cover member
590 third fastener
592 pressing element
596 grounding clip
598 tabs
600 slots
602 strength member pocket
660 alternative clamp assembly
662 main body
666 first body
668 projections
670 slots
676 first fastener
696 second fastener
698 grounding clip
760 alternative clamp assembly
762 main body
766 first body
768 clip
770 slot
780 projections
782 slot
788 slot
790 first fastener
800 strength member clamp assembly 802 pocket
804 cover member
806 strength member pocket
810 second fastener
820 ears
824 clip arm
826 clip slots
900 clamp holder
902 clips
904 pockets
910 clip arm
912 clip arm
920 aperture
922 aperture
940 seal block
942 sealing unit
944 cable sealing modules
946 actuator
956 grounding clip

What is claimed is:

1. A cable clamp assembly for a cable having a jacket and one or more inner optical fibers, the cable clamp assembly comprising:
   a main body;
   a first body; and
   a wrap being mounted to the first body and extendable around the jacket, wherein the wrap is adjustable in length to accommodate different diameters for the jacket; and wherein the first body is positioned between a pair of guides of the main body, the first body being mounted to the main body with a first fastener positioned between the pair of guides, the first fastener being adjustable to move the first body relative to the main body to adjust a tightness of the wrap around the jacket.

2. The cable clamp assembly of claim 1, wherein the first body moves linearly perpendicular to the cable.

3. The cable clamp assembly of claim 1, wherein the wrap includes a loop and a coextensive portion.

4. The cable clamp assembly of claim 1, further comprising a second fastener that mounts the wrap to the first body.

5. The cable clamp assembly of claim 4, wherein the second fastener passes through the wrap to mount the wrap to the first body.

6. The cable clamp assembly of claim 1, wherein the first fastener is configured to move the first body in a direction away from the main body.

7. The cable clamp assembly of claim 1, further comprising a strength member clamp assembly interconnected to the main body, wherein the strength member clamp assembly includes a second body which is moveably mounted relative to the main body, wherein the second body is mountable to a strength member, wherein the second body is adjustable for different relative positions of the strength member relative to the first body.

8. The cable clamp assembly of claim 7, wherein the second body moves linearly perpendicular to the cable.

9. The cable clamp assembly of claim 7, wherein the second body is mountable to the strength member with a second fastener.

10. The cable clamp assembly of claim 1, further comprising a strength member clamp assembly separate from the main body, the strength member clamp assembly including a body and a block movably mounted relative to the body, the block configured to mount a strength member and adjustable for different relative positions of the strength member.

11. The cable clamp assembly of claim 1, wherein the wrap mounts to the first body with a clip passing through a slot in the wrap, wherein the wrap is adjustable in length to accommodate different diameters for the jacket, wherein the first fastener is configured for moving the first body in a direction away from the main body.

12. The cable clamp assembly of claim 1, further comprising a seal block which provides a mount for the cable clamp assembly on an inside of a closure, wherein cable pull does not pull on or disrupt the cable seal.

13. A cable clamp assembly for a cable having a jacket, inner optical fibers and an inner strength member comprising:
   a jacket clamp assembly and a strength member clamp assembly separate from one another;
   wherein the jacket clamp assembly includes a wrap which is extendable around the jacket, wherein the wrap is adjustable in length to accommodate different diameters for the jacket, the wrap including a first loop portion and two coextensive second portions extending perpendicularly from the first loop portion, the coextensive second portions being aligned parallel strips in contact with one another; and
   wherein the strength member clamp assembly includes a body mountable to the strength member with a fastener.

* * * * *